(12) United States Patent
Rosewarne et al.

(10) Patent No.: US 10,298,961 B2
(45) Date of Patent: May 21, 2019

(54) METHOD, APPARATUS AND SYSTEM FOR DE-BLOCKING A BLOCK OF VIDEO SAMPLES

(71) Applicant: CANON KABUSHIKI KAISHA, Tokyo (JP)

(72) Inventors: Christopher James Rosewarne, Concord West (AU); Jonathan Gan, Ryde (AU); Volodymyr Kolesnikov, Dee Why (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/313,917

(22) PCT Filed: May 28, 2015

(86) PCT No.: PCT/AU2015/000315
§ 371 (c)(1),
(2) Date: Nov. 23, 2016

(87) PCT Pub. No.: WO2015/179898
PCT Pub. Date: Dec. 3, 2015

(65) Prior Publication Data
US 2017/0127090 A1 May 4, 2017

(30) Foreign Application Priority Data
May 29, 2014 (AU) ................................ 2014202921

(51) Int. Cl.
*H04N 19/86* (2014.01)
*H04N 19/117* (2014.01)
(Continued)

(52) U.S. Cl.
CPC ........... *H04N 19/86* (2014.11); *H04N 19/103* (2014.11); *H04N 19/117* (2014.11);
(Continued)

(58) Field of Classification Search
CPC .... H04N 19/86; H04N 19/103; H04N 19/117; H04N 19/139; H04N 19/159; H04N 19/176
See application file for complete search history.

(56) References Cited

U.S. PATENT DOCUMENTS

| 7,450,641 | B2 | 11/2008 | Sun |
| 7,907,789 | B2 | 3/2011 | Yan |
| 2016/0241868 | A1* | 8/2016 | Li ........................ H04N 19/56 |

FOREIGN PATENT DOCUMENTS

| CN | 101212665 A | 7/2008 |
| CN | 101472176 A | 7/2009 |

(Continued)

OTHER PUBLICATIONS

Flynn et al. "BoG report on range Extension Topics" 15th Meeting : Geneva, CH, Oct. 23-Nov. 1, 2013 pp. 1-49.

(Continued)

*Primary Examiner* — Christopher Braniff
(74) *Attorney, Agent, or Firm* — Canon U.S.A., Inc. IP Division

(57) ABSTRACT

A method of de-blocking an edge of a block of samples of video data is disclosed. A first prediction mode is decoded for a first block of two adjacent blocks of video data, each of the blocks of video data including a primary color channel and at least one secondary color channel. A second prediction mode is decoded for a second block of the two adjacent blocks of video data. A boundary strength value is determined for a block of samples along an edge corresponding to a boundary between said first block of video data and said second block of video data. A weak de-blocking filter is applied to the block of data along said edge if the determined boundary strength value indicates that the first prediction mode is intra prediction and the second prediction mode is intra-block copy prediction. The weak de-blocking filter is (Continued)

different to a filter applied to a block determined to have two, adjacently located, intra prediction mode blocks.

11 Claims, 14 Drawing Sheets

(51) Int. Cl.
*H04N 19/176* (2014.01)
*H04N 19/139* (2014.01)
*H04N 19/103* (2014.01)
*H04N 19/159* (2014.01)

(52) U.S. Cl.
CPC ......... *H04N 19/139* (2014.11); *H04N 19/159* (2014.11); *H04N 19/176* (2014.11)

(56) References Cited

FOREIGN PATENT DOCUMENTS

| EP | 3058739 A1 | 8/2016 |
| WO | 2012114724 A1 | 8/2012 |
| WO | 2013/063117 A1 | 5/2013 |
| WO | 2015054811 A1 | 4/2015 |

OTHER PUBLICATIONS

Rosewarne C et al: "On Deblocking for intra Block Copy" (JCTV) of ITU-T SG 16 WP and ISO/IEC JTC 1ZSC 29WG 11; 18th meeting : Sapporo JP, Jun. 30-Jul. 9, 2014 pp. 1-3.

Ismail Marzuki et al. Modified Deblocking Filter for Intra Block Copy ; (JCTV) of ITU-T SG 16 WP and ISO/IEC JTC 1ZSC 29WG 11; 18th meeting : Sapporo JP, Jun. 30-Jul. 9, 2014 pp. 1-5.

Bin Li; "On Intra BC Mode" (JCT-VC) of ITU-T SG 16 WP 3 and ISO/IEC JTC 1/SC 29/WG 11 ; 15th Meeting : Geneva , CH, Oct. 23-Nov. 1 ; pp. 1-12.

Il-Koo Kim et al; High Efficiency Video Coding (HEVC) Test Model 9 (HM9) Encoder Description; JCT-VT Meeting ; 11th Meeting: Shanghai , CN Oct. 10-19, 2012 pp. 1-36.

Flynn et al. "High Efficiency Video Coding (HEVC) Range Extensions text Specification Draft 4", JCTVC-N10005 v1, 13th Meeting, Incheon, KR Apr. 18-26, 2013.

Flynn et al. "High Efficiency Video Coding (HEVC) Range Extensions text Specification Draft 4", JCTVC-N10005_v1, 13th Meeting, Incheon, KR Apr. 18-26, 2013. Sections 7.4.3.3, 7.4.7.1, 7.4.9.5, 7.4.9.9, 8.4.1, 8.4.4.1, 8.4.4.2.7, 8.7.1, 8.7.2.1.

Andrey Norkin et al. "HEVC Deblocking Filter. IEEE Transactions on Circuits and Systems for Video Technology", Dec. 2012, pp. 1746-1673.

Flynn et al "High Efficiency Video Coding (HEVC) Range Extensions text Specification Draft 7", JCTVC-Q1005_v9, 17th Meeting, Valencia, ES, Mar. 17-Apr. 4, 2014.

S. Liu, "SCCE1 Description", Email From: Shan Liu [mailto:Shan. Liu@mediatek.com] Sent: Thursday, Apr. 17, 2014 11:59 AM To: Chris Rosewame; Sole Rojals, Joel Subject: RE: RE: RE: RE: SCCE1 description.

Flynn et al "High Efficiency Video Coding (HVEC) Range Extensions text Specification: Draft 6", JCTVC-P1005_v1 16th Meeting: San Jose, US, Jan. 9-17, 2014.

Xiaoyu et al Description of screen content coding technology proposal by InterDigital, JCTVC-Q0037, 17th Meeting: Valencia, ES Mar. 27-Apr. 4, 2014.

* cited by examiner

METHOD, APPARATUS AND SYSTEM FOR DE-BLOCKING A BLOCK OF VIDEO SAMPLES

CROSS-REFERENCE TO RELATED APPLICATIONS

The present application is a National Phase application of International Patent Application No. PCT/AU2015/000315, filed May 28, 2015, entitled "METHOD, APPARATUS AND SYSTEM FOR DE-BLOCKING A BLOCK OF VIDEO SAMPLES", which claims priority to Australian Application No. 2014202921, filed May 29, 2014, both of which are hereby expressly incorporated by reference herein in their entirety.

TECHNICAL FIELD

The present invention relates generally to digital video signal processing and, in particular, to a method, apparatus and system for de-blocking a block of video samples. The present invention also relates to a computer program product including a computer readable medium having recorded thereon a computer program for de-blocking a block of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Collaborative Team on Video Coding" (JCT-VC). The Joint Collaborative Team on Video Coding (JCT-VC) includes members of Study Group 16, Question 6 (SG16/Q6) of the Telecommunication Standardisation Sector (ITU-T) of the International Telecommunication Union (ITU), known as the Video Coding Experts Group (VCEG), and members of the International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG).

The Joint Collaborative Team on Video Coding (JCT-VC) has produced a new video coding standard that significantly outperforms the "H.264/MPEG-4 AVC" (ISO/IEC 14496-10) video coding standard. The new video coding standard has been named "high efficiency video coding (HEVC)". Further development of high efficiency video coding (HEVC) is directed towards introducing improved support for content known variously as 'screen content' or 'discontinuous tone content'. Such content is typical of video output from a computer or a tablet device, e.g. from a DVI connector or as would be transmitted over a wireless HDMI link. Such content is poorly handled by previous video compression standards and thus a new activity directed towards improving the achievable coding efficiency for this type of content is underway.

Video data includes one or more colour channels. Generally there is one primary colour channel and two secondary colour channels. The primary colour channel is generally referred to as the 'luma' channel and the secondary colour channel(s) are generally referred to as the 'chroma' channels. Video data is represented using a colour space, such as 'YCbCr' or 'RGB'.

For screen content applications, 'RGB' is commonly used, as this is the format generally used to drive LCD panels. The greatest signal strength is present in the 'G' (green) channel, so generally the G channel is coded using the primary colour channel, and the remaining channels (i.e. 'B' and 'R') are coded using the secondary colour channels. Such a coding method may be referred to as 'GBR'. When the 'YCbCr' colour space is in use, the 'Y' channel is coded using the primary colour channel and the 'Cb' and 'Cr' channels are coded using the secondary colour channels.

Video data is also represented using a particular chroma format. The spatial sampling of the primary colour channel and the secondary colour channels are spatially sampled at the same spatial density when the 4:4:4 chroma format is in use. For screen content, the commonly used chroma format is 4:4:4, as generally LCD panels provide pixels at a 4:4:4 format. The bit-depth defines the bit width of samples in the respective colour channel, which implies a range of available sample values. Generally, all colour channels have the same bit-depth, although the colour channels may also have different bit-depths.

In high efficiency video coding (HEVC), there are three types of prediction methods used: intra-prediction, intra-block copy prediction and inter-prediction. Intra-prediction and intra-block copy methods allow content of one part of a video frame to be predicted from other parts of the same video frame. Intra-prediction methods typically produce a block of samples having a directional texture, with an intra-prediction mode specifying the direction of the texture and neighbouring samples within a frame used as a basis to produce the texture. The intra-block copy prediction method uses a block of samples from the current frame as a prediction for a current block of samples.

Inter-prediction methods predict the content of a block of samples within a video frame from blocks in previous video frames. The previous video frames (i.e. in 'decoding order' as opposed to 'display order' which may be different) may be referred to as 'reference frames'. An inter-predicted prediction unit may reference one reference frame when configured for 'uni-directional' inter-prediction or two reference frames when configured for 'bi-directional' inter-prediction. One block of samples is obtained from each reference frame. Each reference frame is selected from a list of reference pictures. The block of samples is spatially offset relative to the location of the considered prediction unit (PU) using a motion vector. Where the prediction unit (PU) is configured for bi-directional inter-prediction, separate motion vectors are applied to obtain blocks of samples from each reference frame.

The first video frame within a sequence of video frames typically uses intra-prediction for all blocks of samples within the frame, as no prior frame is available for reference. Subsequent video frames may use one or more previous video frames from which to predict blocks of samples. To maximise coding efficiency, the prediction method that produces a predicted block that is closest to captured frame data is typically used. The remaining difference between the predicted block of samples and the captured frame data is known as the 'residual'. The spatial domain representation of the difference is generally transformed into a frequency domain representation. Generally, the frequency domain representation compactly stores information present in the spatial domain representation for content captured from an imaging sensor, also referred to as 'natural content', 'continuous tone content', or 'camera captured content'. For screen content, sharper edges resulting from the software rendering of content such as fonts, window edges and icons results is less efficiently represented in the frequency domain. The frequency domain representation includes a block of 'residual coefficients' that results from applying a transform, such as an integer discrete cosine transform (DCT). Moreover, the residual coefficients (or 'scaled transform coefficients') are quantised, which introduces loss but also further reduces the amount of information required to be encoded in a bitstream. The lossy frequency domain representation of the residual, also known as 'transform coefficients', may be stored in the bitstream. Each residual coefficient having a nonzero value is referred to as a 'significant' residual coefficient. The amount of "lossiness" in the residual recovered in a decoder affects the distortion of video data decoded from a bitstream compared to the captured frame data and the size of the bitstream.

SUMMARY

It is an object of the present invention to substantially overcome, or at least ameliorate, one or more disadvantages of existing arrangements.

According to one aspect of the present disclosure, there is provided a method of de-blocking an edge of a block of samples of video data, the method comprising:
  decoding a first prediction mode for a first block of two adjacent blocks of video data, each of the blocks of video data including a primary colour channel and at least one secondary colour channel;
  decoding a second prediction mode for a second block of the two adjacent blocks of video data;
  determining a boundary strength value for a block of samples along an edge corresponding to a boundary between said first block of video data and said second block of video data if the first prediction mode and the second prediction mode are both intra-block copy, wherein the boundary strength value indicates application of a weak de-blocking filter if block vectors associated with the two adjacent blocks have different magnitudes and indicates no de-blocking filtering is applied if the block vectors have equal magnitudes; and
  applying the weak de-blocking filter to the block of data along said edge of the two blocks only if the determined boundary strength value indicates that the weak de-blocking filter should be applied, the weak de-blocking filter being different to a filter applied to an edge determined to have two, adjacently located, intra prediction mode blocks.

According to another aspect of the present disclosure, there is provided an apparatus for de-blocking an edge of a block of samples of video data, the apparatus comprising:
  decoding module for decoding a first prediction mode for a first block of two adjacent blocks of video data, and for decoding a second prediction mode for a second block of the two adjacent blocks of video data, each of the blocks of video data including a primary colour channel and at least one secondary colour channel;
  determining module for determining a boundary strength value for a block of samples along an edge corresponding to a boundary between said first block of video data and said second block of video data if the first prediction mode and the second prediction mode are both intra-block copy, wherein the boundary strength value indicates application of a weak de-blocking filter if block vectors associated with the two adjacent blocks have different magnitudes and indicates no de-blocking filtering is applied if the block vectors have equal magnitudes; and
  applying module for applying the weak de-blocking filter to the block of data along said edge of the two blocks only if the determined boundary strength value indicates that the weak de-blocking filter should be applied, the weak de-blocking filter being different to a filter applied to an edge determined to have two, adjacently located, intra prediction mode blocks.

According to still another aspect of the present disclosure, there is provided a system for de-blocking an edge of a block of samples of video data, the system comprising:
  a memory for storing data and a computer program;
  a processor coupled to the memory for executing the computer program, the computer program comprising instructions for:
    decoding a first prediction mode for a first block of two adjacent blocks of video data, each of the blocks of video data including a primary colour channel and at least one secondary colour channel;
    decoding a second prediction mode for a second block of the two adjacent blocks of video data;
    determining a boundary strength value for a block of samples along an edge corresponding to a boundary between said first block of video data and said second block of video data if the first prediction mode and the second prediction mode are both intra-block copy, wherein the boundary strength value indicates application of a weak de-blocking filter if block vectors associated with the two adjacent blocks have different magnitudes and indicates no de-blocking filtering is applied if the block vectors have equal magnitudes; and
    applying the weak de-blocking filter to the block of data along said edge of the two blocks only if the determined boundary strength value indicates that the weak de-blocking filter should be applied, the weak de-blocking filter being different to a filter applied to an edge determined to have two, adjacently located, intra prediction mode blocks.

According to still another aspect of the present disclosure, there is provided a non-transitory computer readable medium having a computer program stored on the medium for de-blocking an edge of a block of samples of video data, the program comprising:
  code for decoding a first prediction mode for a first block of two adjacent blocks of video data, each of the blocks of video data including a primary colour channel and at least one secondary colour channel;
  code for decoding a second prediction mode for a second block of the two adjacent blocks of video data;
  code for determining a boundary strength value for a block of samples along an edge corresponding to a boundary between said first block of video data and said second block of video data if the first prediction mode and the second prediction mode are both intra-block copy, wherein the boundary strength value indicates application of a weak de-blocking filter if block vectors associated with the two adjacent blocks have different magnitudes and indicates no de-blocking filtering is applied if the block vectors have equal magnitudes; and
  code for applying the weak de-blocking filter to the block of data along said edge of the two blocks only if the determined boundary strength value indicates that the weak de-blocking filter should be applied, the weak de-blocking filter being different to a filter applied to an edge determined to have two, adjacently located, intra prediction mode blocks.

According to still another aspect of the present disclosure, there is provided a method of de-blocking an edge of a block of samples of video data, the method comprising:
 decoding a first prediction mode for a first block of two adjacent blocks of video data, each of the blocks of video data including a primary colour channel and at least one secondary colour channel;
 decoding a second prediction mode for a second block of the two adjacent blocks of video data;
 determining a boundary strength value for a block of samples along an edge corresponding to a boundary between said first block of video data and said second block of video data; and
 applying a weak de-blocking filter to the block of data along said edge if the determined boundary strength value indicates that the first prediction mode is intra prediction and the second prediction mode is intra-block copy prediction, the weak de-blocking filter being different to a filter applied to a block determined to have two, adjacently located, intra prediction mode blocks.

According to another aspect of the present disclosure, there is provided an apparatus for de-blocking an edge of a block of samples of video data, the apparatus comprising:
 decoding module for decoding a first prediction mode for a first block of two adjacent blocks of video data, and for decoding a second prediction mode for a second block of the two adjacent blocks of video data, each of the blocks of video data including a primary colour channel and at least one secondary colour channel;
 determining module for determining a boundary strength value for a block of samples along an edge corresponding to a boundary between said first block of video data and said second block of video data; and
 applying module for applying a weak de-blocking filter to the block of data along said edge if the determined boundary strength value indicates that the first prediction mode is intra prediction and the second prediction mode is intra-block copy prediction, the weak de-blocking filter being different to a filter applied to a block determined to have two, adjacently located, intra prediction mode blocks.

According to still another aspect of the present disclosure, there is provided a system for de-blocking an edge of a block of samples of video data, the system comprising:
 a memory for storing data and a computer program;
 a processor coupled to the memory for executing the computer program, the computer program comprising instructions for:
  decoding a first prediction mode for a first block of two adjacent blocks of video data, each of the blocks of video data including a primary colour channel and at least one secondary colour channel;
  decoding a second prediction mode for a second block of the two adjacent blocks of video data;
  determining a boundary strength value for a block of samples along an edge corresponding to a boundary between said first block of video data and said second block of video data; and
  applying a weak de-blocking filter to the block of data along said edge if the determined boundary strength value indicates that the first prediction mode is intra prediction and the second prediction mode is intra-block copy prediction, the weak de-blocking filter being different to a filter applied to a block determined to have two, adjacently located, intra prediction mode blocks.

According to still another aspect of the present disclosure, there is provided a computer readable medium having a computer program stored on the medium for de-blocking an edge of a block of samples of video data, the program comprising:
 code for decoding a first prediction mode for a first block of two adjacent blocks of video data, each of the blocks of video data including a primary colour channel and at least one secondary colour channel;
 code for decoding a second prediction mode for a second block of the two adjacent blocks of video data;
 code for determining a boundary strength value for a block of samples along an edge corresponding to a boundary between said first block of video data and said second block of video data; and
 code for applying a weak de-blocking filter to the block of data along said edge if the determined boundary strength value indicates that the first prediction mode is intra prediction and the second prediction mode is intra-block copy prediction, the weak de-blocking filter being different to a filter applied to a block determined to have two, adjacently located, intra prediction mode blocks.

According to still another aspect of the present disclosure, there is provided a de-blocking method comprising:
 decoding a first prediction mode for a first block of two adjacent blocks of video data, each of the blocks of video data including a primary colour channel and at least one secondary colour channel;
 decoding a second prediction mode for a second block of the two adjacent blocks of video data;
 determining a boundary strength value for a block of samples along an edge corresponding to a boundary between said first block of video data and said second block of video data; and
 applying a de-blocking filter to only the primary colour channel data along said edge if the determined boundary strength value indicates that the first prediction mode is intra prediction and the second prediction mode is intra-block copy prediction.

According to still another aspect of the present disclosure, there is provided a de-blocking apparatus comprising:
 decoding module for decoding a first prediction mode for a first block of two adjacent blocks of video data, and for decoding a second prediction mode being for a second block of the two adjacent blocks of video data, each of the blocks of video data including a primary colour channel and at least one secondary colour channel;
 determining module for determining a boundary strength value for a block of samples along an edge corresponding to a boundary between said first block of video data and said second block of video data; and
 de-blocking filter module for applying a de-blocking filter to only the primary colour channel data along said edge if the determined boundary strength value indicates that the first prediction mode is intra prediction and the second prediction mode is intra-block copy prediction.

According to still another aspect of the present disclosure, there is provided a de-blocking system comprising:
 a memory for storing data and a computer program;
 a processor coupled to the memory for executing the computer program, the computer program comprising instructions for:
  decoding a first prediction mode for a first block of two adjacent blocks of video data, each of the blocks of video data including a primary colour channel and at least one secondary colour channel;

decoding a second prediction mode for a second block of the two adjacent blocks of video data;

determining a boundary strength value for a block of samples along an edge corresponding to a boundary between said first block of video data and said second block of video data; and applying a de-blocking filter to only the primary colour channel data along said edge if the determined boundary strength value indicates that the first prediction mode is intra prediction and the second prediction mode is intra-block copy prediction.

According to still another aspect of the present disclosure, there is provided a computer readable medium having a computer program stored on the medium for performing a de-blocking method, the program comprising:

code for decoding a first prediction mode for a first block of two adjacent blocks of video data, each of the blocks of video data including a primary colour channel and at least one secondary colour channel;

code for decoding a second prediction mode for a second block of the two adjacent blocks of video data;

code for determining a boundary strength value for a block of samples along an edge corresponding to a boundary between said first block of video data and said second block of video data; and code for applying a de-blocking filter to only the primary colour channel data along said edge if the determined boundary strength value indicates that the first prediction mode is intra prediction and the second prediction mode is intra-block copy prediction.

Other aspects are also disclosed.

BRIEF DESCRIPTION OF THE DRAWINGS

At least one embodiment of the present invention will now be described with reference to the following drawings and and appendices, in which.

DETAILED DESCRIPTION INCLUDING BEST MODE

Figure 1:
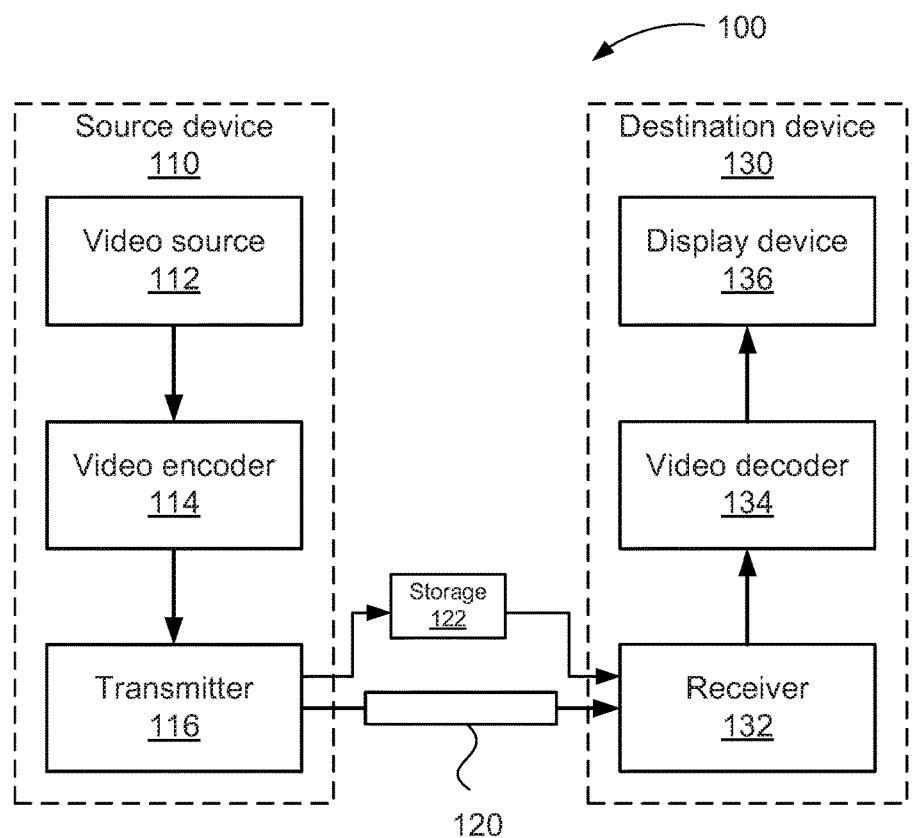
FIG. 1 is a schematic block diagram showing a video encoding and decoding system.

Where reference is made in any one or more of the accompanying drawings to steps and/or features, which have the same reference numerals, those steps and/or features have for the purposes of this description the same function(s) or operation(s), unless the contrary intention appears.

To reduce artefacts resulting from a quantisation process, a 'de-blocking' filter may be applied to smooth boundaries between blocks of video data. Smoothing discrepancies between adjacent blocks of video data can substantially improve perceived (i.e. subjective) quality of decoded video data. Smoothing discrepancies between adjacent blocks of video data can also improve peak signal to noise ratio (PSNR), which is a metric for objective quality of decoded video data.

FIG. 1 is a schematic block diagram showing function modules of a video encoding and decoding system 100. The system 100 may utilise methods for de-blocking to improve subjective and objective video quality in the presence of "screen content". Screen content is content containing high frequency information which should not be filtered as strongly as continuous tone content.

The system 100 includes a source device 110 and a destination device 130. A communication channel 120 is used to communicate encoded video information from the source device 110 to the destination device 130. In some arrangements, the source device 110 and destination device 130 may comprise respective mobile telephone hand-sets, in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over the air television broadcasts, cable television applications, internet video applications and applications where encoded video data is captured on some storage medium or a file server.

As shown in FIG. 1, the source device 110 includes a video source 112, a video encoder 114 and a transmitter 116. The video source 112 typically comprises a source of captured video frame data, such as an imaging sensor, a previously captured video sequence stored on a non-transitory recording medium, or a video feed from a remote imaging sensor. The video source 112 may also be the output of a computer graphics card displaying, for example, the video output of an operating system and various computer applications. Such content is an example of 'screen content'. Examples of source devices 110 that may include an imaging sensor as the video source 112 include smart-phones, video camcorders and network video cameras. The video encoder 114 converts the captured frame data from the video source 112 into encoded video data and will be described further with reference to FIG. 3. The encoded video data is typically an encoded bitstream and is transmitted by the transmitter 116 over the communication channel 120 as encoded video data (or "encoded video information"). It is also possible for the encoded video data to be stored in a non-transitory storage device 122, such as a "Flash" memory or a hard disk drive, until later being transmitted over the communication channel 120, or in-lieu of transmission over the communication channel 120.

The destination device 130 includes a receiver 132, a video decoder 134 and a display device 136. The receiver 132 receives encoded video data from the communication channel 120 and passes received video data to the video decoder 134. The video decoder 134 then outputs decoded frame data to the display device 136. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device.

Figure 2A:
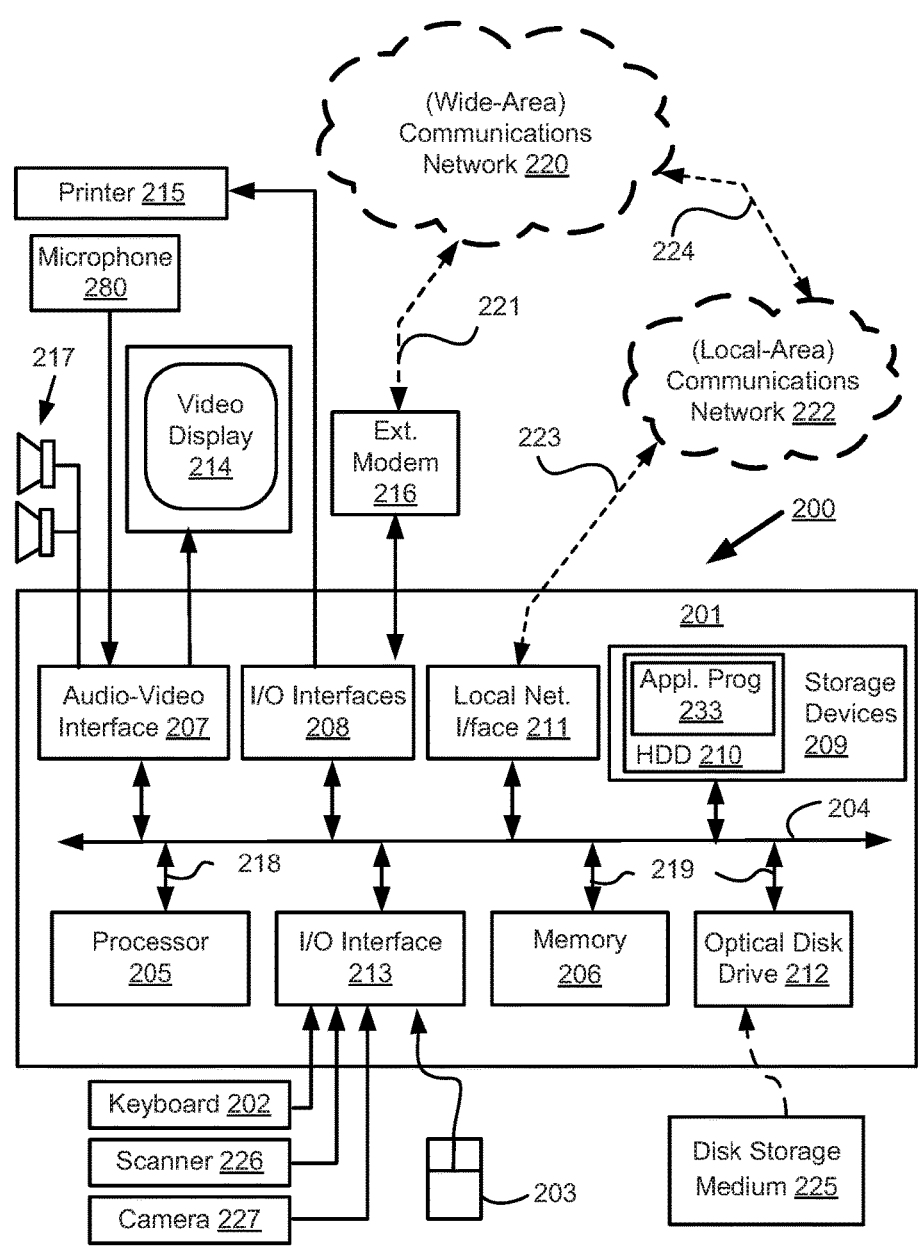
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card and provides an example of 'screen content'. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100, or the source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200 wherein the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
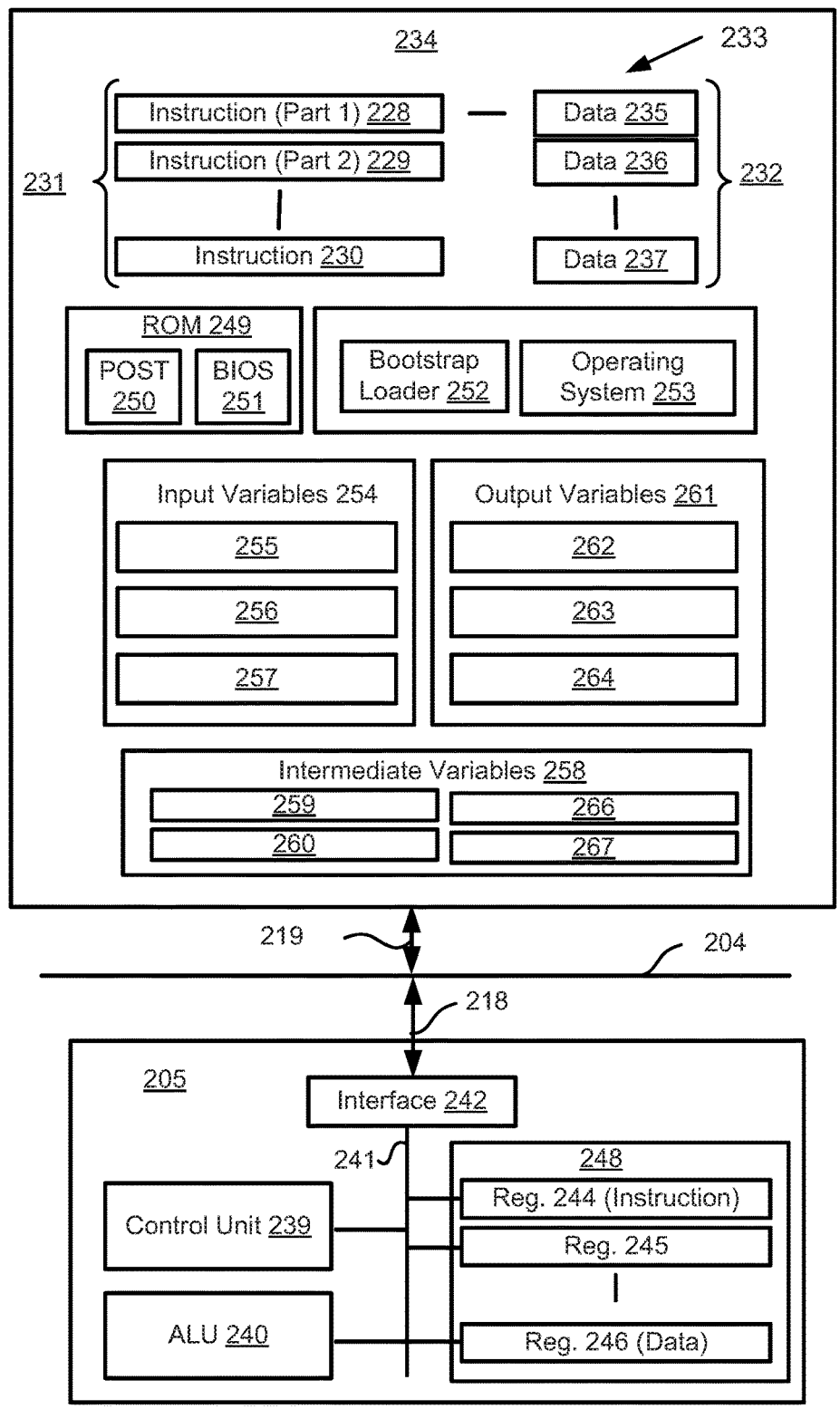

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;
(b) a decode operation in which the control unit 239 determines which instruction has been fetched; and
(c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 11:
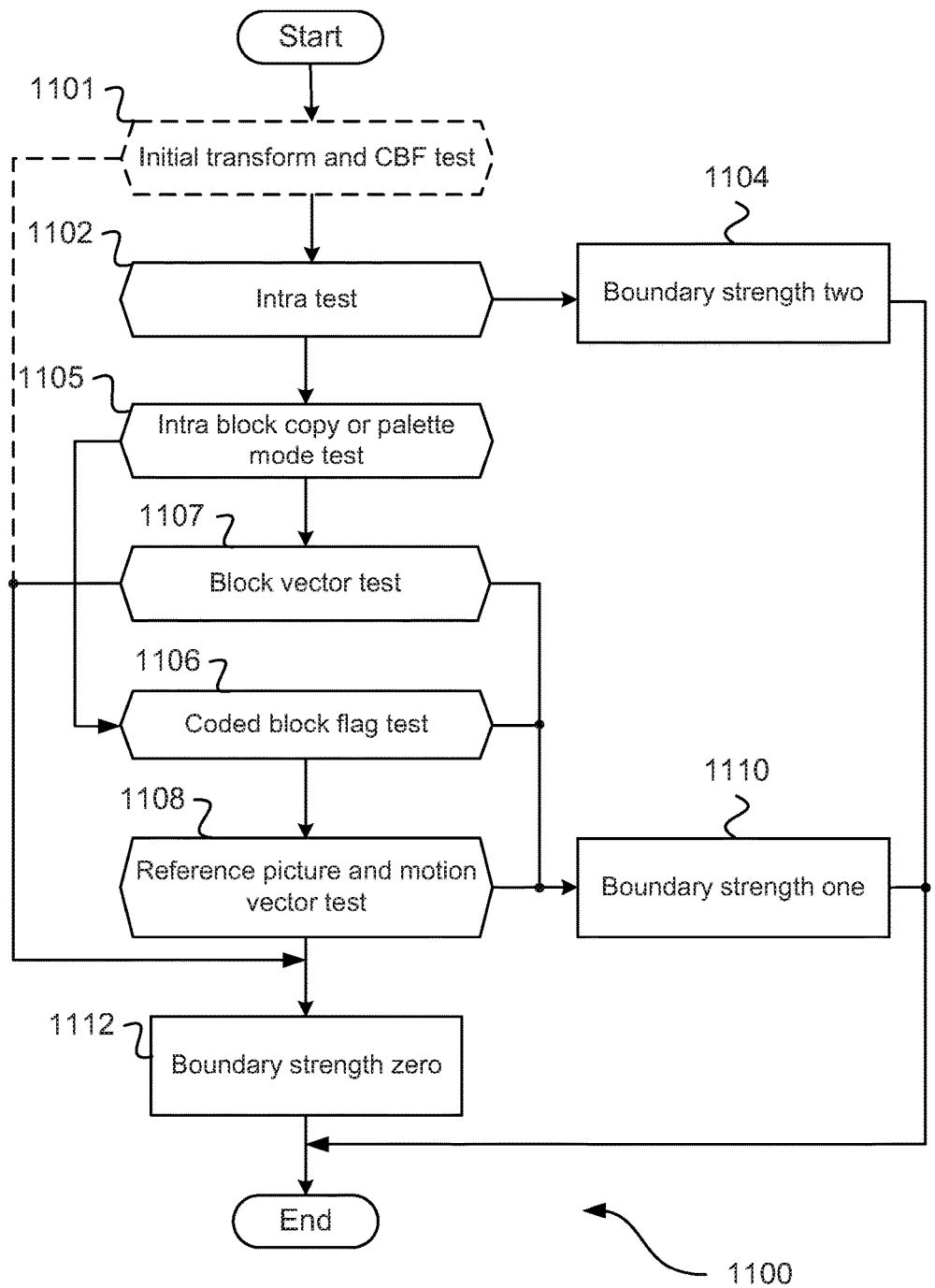
FIG. 11 is a schematic flow diagram showing a method for setting a boundary strength for a de-blocking filter.
Figure 12:
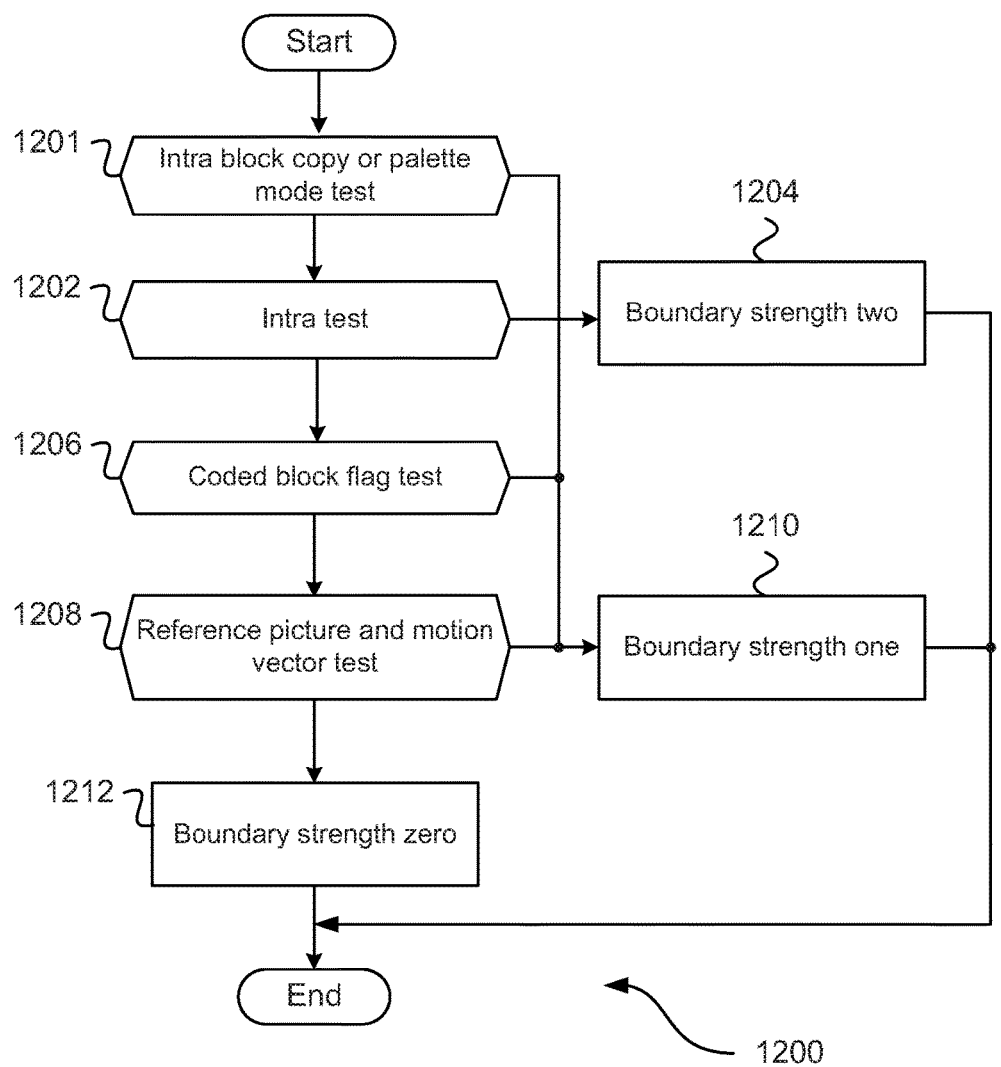
FIG. 12 is a schematic flow diagram showing a method for setting a boundary strength for a de-blocking filter.
Figure 13:
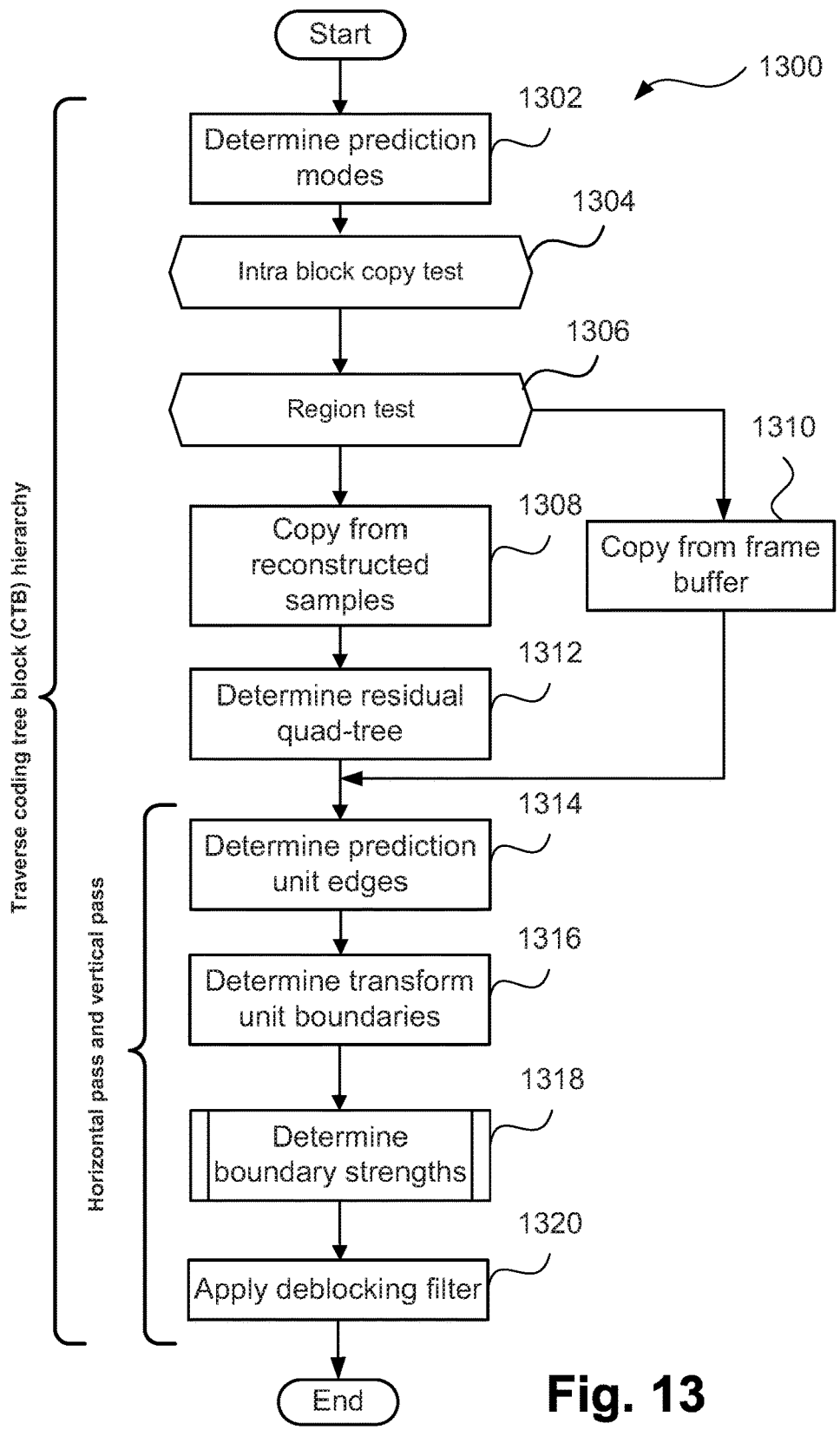
FIG. 13 is a schematic flow diagram showing a method for intra-block copying and de-blocking a block of video data; and Appendix 1 and Appendix 2 provide syntax tables according to the HEVC standard modified according to the modifications and variations disclosed herein.

Each step or sub-process in the methods of FIGS. 11, 12 and 13, to be described is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3:
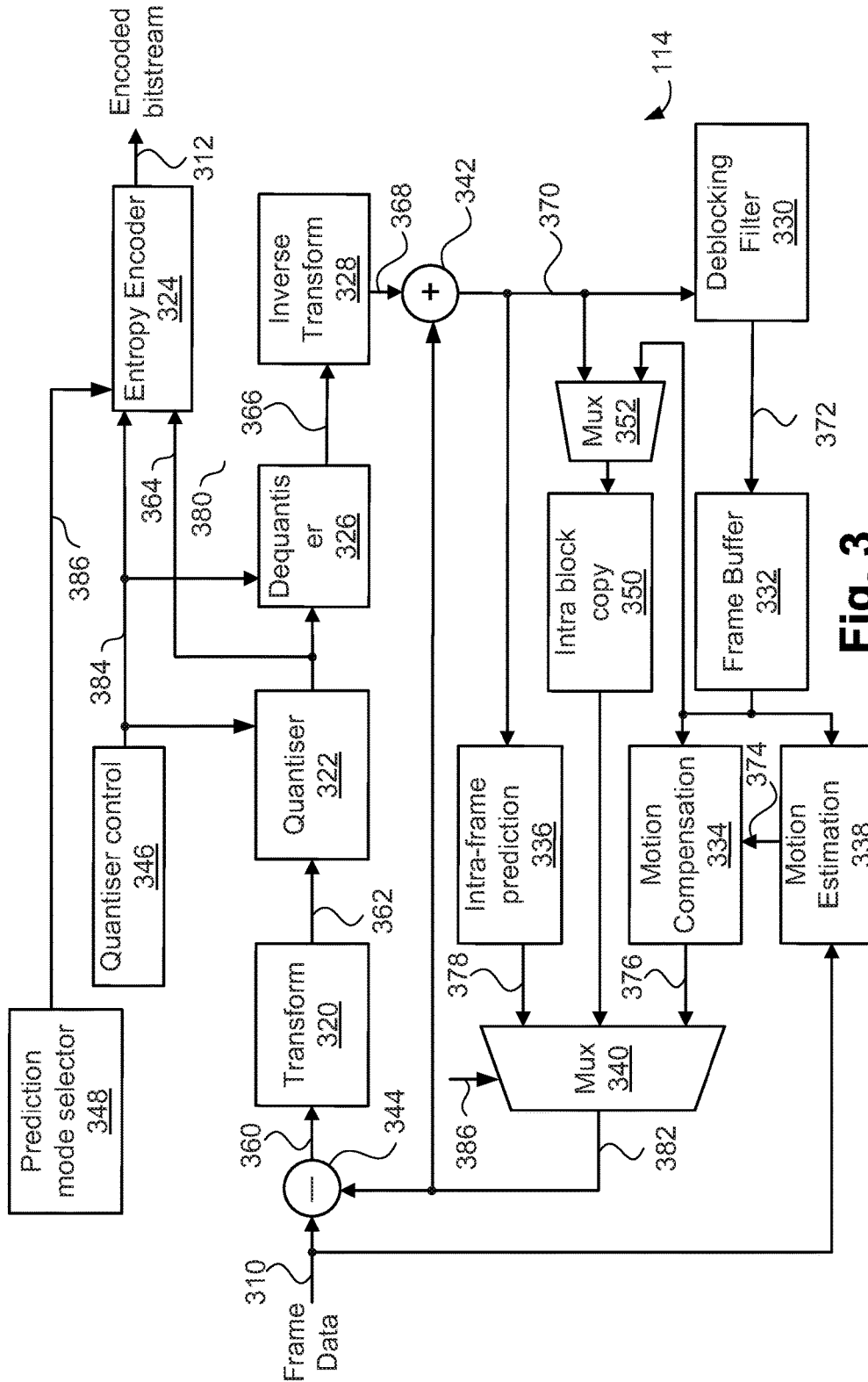
FIG. 3 is a schematic block diagram showing functional modules of a video encoder.
Figure 4:
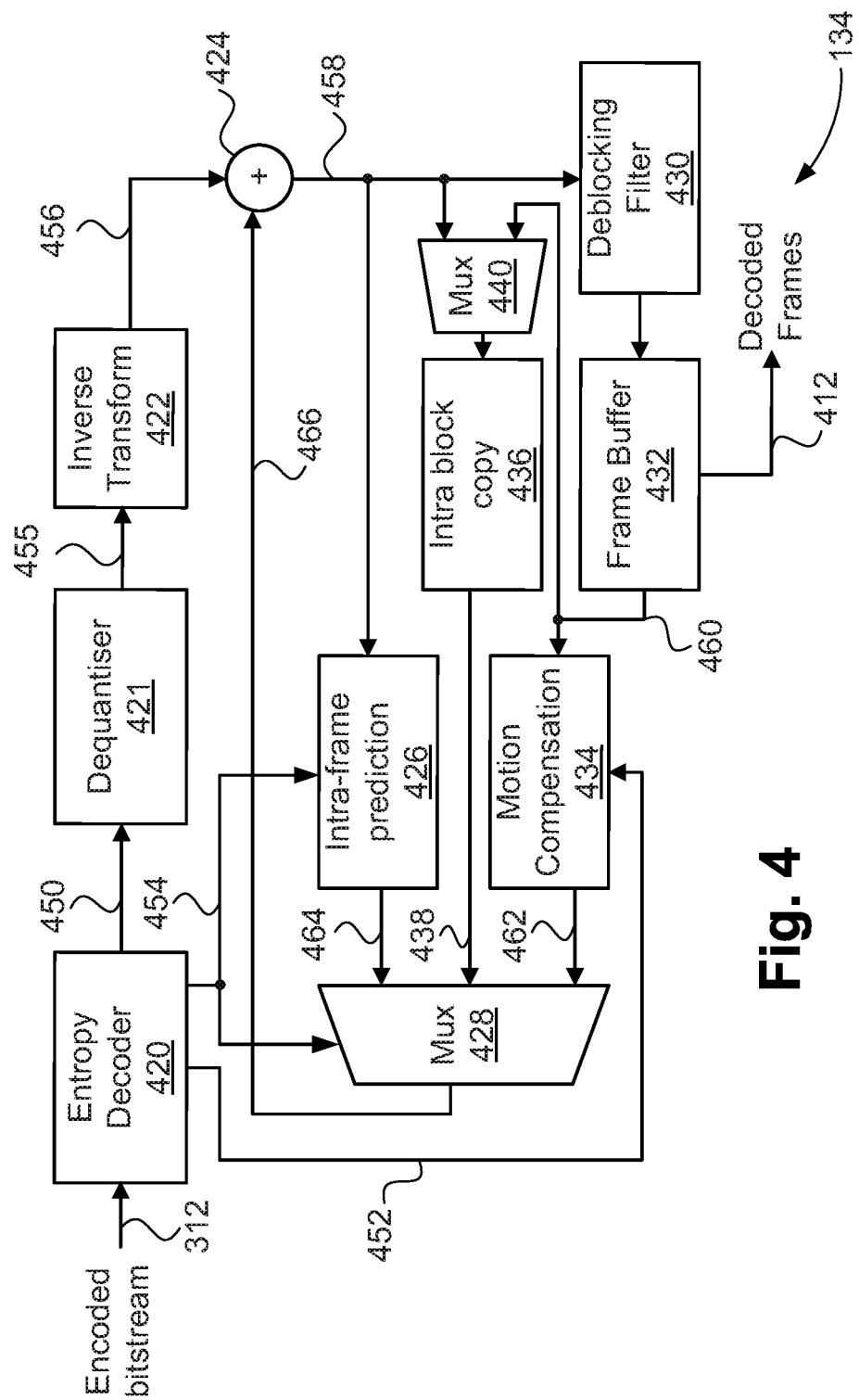
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data is passed between functional modules within the video encoder 114 and the video decoder 134 in blocks or arrays (e.g., blocks of samples or blocks of transform coefficients). Where a functional module is described with reference to the behaviour of individual array elements (e.g., samples or transform coefficients), the behaviour shall be understood to be applied to all array elements. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205, or alternatively by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories. In particular the video encoder 114 comprises modules 320-350 and the video decoder 134 comprises modules 420-440 which may each be implemented as one or more software code modules of the software application program 233.

Although the video encoder 114 of FIG. 3 is an example of a high efficiency video coding (HEVC) video encoding pipeline, other video codecs may also be used to perform the processing stages described herein. The video encoder 114 receives captured frame data, such as a series of frames, each frame including one or more colour channels.

The video encoder 114 divides each frame of the captured frame data, such as frame data 310, into square regions generally referred to as 'coding tree units' (CTUs) with side sizes which are powers of two. The coding tree units (CTUs) in the frame data 310 are generally scanned in a raster scan order. Each coding tree unit (CTU) is associated with all colour channels of an image represented by a current frame, such that each coding tree unit (CTU) includes one coding tree block (CTB) for each colour channel. For example, in a frame coded using the YCbCr colour space, a coding tree unit (CTU) consists of three coding tree blocks (CTBs) for Y, Cb and Cr colour planes corresponding to the same spatial location in the image represented by the frame. The size of individual coding tree blocks (CTBs) may vary across colour components and generally depends on used colour component scaling mode, or 'chroma format'. For example, in the mode generally known as "4:4:4" chroma format, where all colour components have the same size, the sizes of the coding tree blocks (CTBs) will be the same. In the mode generally known as "4:2:0" chroma format, where chroma components are scaled down by a factor of two both horizontally and vertically, the sizes of chroma coding tree blocks (CTBs) will be twice as small (both horizontally and vertically) than the size of the luma coding tree block (CTB). When a size of a coding tree unit (CTU) is specified, the size usually refers to the size of the luma coding tree block (CTB). The sizes of the chroma coding tree blocks (CTBs) may be inferred from the size of the coding tree unit (CTU) and the colour component scaling mode.

Each coding tree unit (CTU) includes a hierarchical quad-tree subdivision of a portion of a frame with a collection of 'coding units' (CUs), such that at each leaf node of the hierarchical quad-tree subdivision one coding unit (CU) exists. Each coding unit (CU) includes a two-dimensional array of samples, or a 'block of samples' for each colour channel. The subdivision can be continued until the coding units (CU) present at the leaf nodes have reached a specific minimum size. The specific minimum size is referred to as a smallest coding unit (SCU) size. Generally, the smallest coding unit (SCU) size is 8×8, but other sizes are also possible, such as 16×16 or 32×32. The size of a coding unit (CU) is specified in units of luma samples. The corresponding coding block (CB) for the luma channel will thus have the same dimensions as the coding unit (CU). The corresponding coding blocks (CBs) for the chroma channels will have dimensions scaled according to the chroma subsampling size. If no subdivision of a coding tree unit (CTU) is performed and a single coding unit (CU) occupies the whole coding tree unit (CTU) such a coding unit (CU) is referred to as a largest coding unit (LCU) (or maximum coding unit size). Generally the largest coding unit (LCU) size is 64×64. However, other sizes of the largest coding unit (LCU) are also possible, such as 32×32 and 16×16. The dimensions of the largest coding unit (LCU) are also specified in units of luma samples. As a result of the quad-tree hierarchy, the entirety of the coding tree unit (CTU) is occupied by one or more coding units (CUs). The largest coding unit size is signalled in the bitstream for a collection of frames known as a coded video sequence. For a particular frame, the largest coding unit (LCU) size and the smallest coding unit (SCU) size do not vary.

The video encoder 114 produces one or more 'prediction units' (PUs) for each coding block (CU). Various arrangements of prediction units (PUs) in each coding unit (CU) are possible and each arrangement of prediction units (PUs) in a coding unit (CU) is referred to as a 'partition mode'. The prediction units (PUs) for each coding block (CU) produced by the video encoder 114 do not overlap. Further, the entirety of a coding unit (CU) is occupied by the one or more prediction units (PUs) produced by the video encoder 114 for the coding unit (CU), so that the prediction units (PUs) cover the area of a frame, corresponding to each of the coding tree units (CTUs) in the frame. A partitioning of a coding unit (CU) into prediction units (PUs) results in subdivision of coding blocks (CBs) for each colour component into 'prediction blocks' (PBs). Depending on the colour component scaling mode used for the subdivision, the sizes of prediction blocks (PBs) corresponding to the same coding unit (CU) for different colour components may differ in size.

The video encoder 114 outputs a prediction unit (PU) 382 from a multiplexer module 340. A difference module 344 produces a 'residual sample array' 360. The residual sample array 360 is the difference between the prediction unit (PU) 382 and a corresponding 2D array of data samples from a coding unit (CU) of the coding tree block (CTB) of the frame data 310. The difference between the prediction unit (PU) 382 and a corresponding 2D array is calculated for corresponding samples at each location in the arrays. As the difference between the prediction unit (PU) 382 and a corresponding 2D array may be positive or negative, the dynamic range of one difference sample is the bit-depth plus one bit.

The residual sample array 360 may be transformed into the frequency domain in a transform module 320. The residual sample array 360 from the difference module 344 is received by transform module 320, which converts the residual sample array 360 from a spatial representation to a frequency domain representation by applying a 'forward transform'. The transform module 320 creates transform coefficients, according to a transform having a specific precision. The coding unit (CU) is sub-divided into one or more transform units (TUs). The sub-divided coding unit (CU) may be referred to as a 'residual quad-tree' or a 'residual quad-tree (RQT)'. A transform unit (TU) is collectively associated with all colour components of a frame. Every transform unit (TU) includes individual transform blocks (TBs) for each colour channel. Depending on the colour component scaling mode applied to the picture transform blocks (TBs), chroma channels may have smaller sizes than a corresponding luma transform block (TB) due to colour component scaling. Transform blocks (TBs), prediction blocks (PBs) and coding blocks (CBs) may each be referred to as 'blocks' or 'blocks of samples' and the type of block should be understood from the context of the usage of the term 'block'. Two blocks are considered "adjacent" or "adjacently located" to each other if no other block is located between the two blocks. The two blocks may have different sizes and still be considered adjacent (or "adjacently located").

Quantiser control module 346 may test the bit-rate required in the encoded bitstream 312 for various possible quantisation parameter values according to a 'rate-distortion criterion'. The rate-distortion criterion is a measure of the acceptable trade-off between the bit-rate of the encoded bitstream 312, or a local region thereof, and distortion. Distortion is a measure of the difference between frames present in frame buffer 332 and the captured frame data 310. Distortion may be determined using a peak signal to noise ratio (PSNR) or sum of absolute differences (SAD) metric. In some arrangements of the video encoder 114, the rate-distortion criterion considers the rate and distortion for the luma colour channel and thus the encoding decision is made based on characteristics of the luma channel. Generally, the residual quad-tree (RQT) is shared between the luma and chroma colour channels, and the amount of chroma information is relatively small compared to luma, so only luma may be considered in the rate-distortion criterion.

A quantisation parameter 384 is output from the quantiser control module 346. The quantisation parameter may be fixed for a frame of video data, or may vary on a block by block basis as the frame is being encoded. Other methods for controlling the quantisation parameter 384 may also be used. The set of possible transform units (TUs) for a residual quad-tree is dependent on the available transform sizes and coding unit (CU) size. A larger sized transform unit (TU) results in use of larger transforms for both the luma and chroma colour channels. Generally, larger transforms provide a more compact representation of a residual sample array with sample data (or 'residual energy') spread across the residual sample array. Smaller transform units (TUs) provide a more compact representation of a residual sample array with residual energy localised to specific regions of the residual sample array. The many possible configurations of a residual quad-tree (RQT) may be used for achieving high coding efficiency of the residual sample array 360 in the high efficiency video coding (HEVC) standard.

A prediction mode selector module 348 selects a prediction mode 386 for the current prediction unit (PU).

A 'transform quantisation bypass' mode is provided, where the transform module 320 and quantisation module 322 are bypassed. The transform quantisation bypass mode is signalled at the coding unit (CU) level using a 'cu_transquant_bypass_flag' syntax element. The transform quantisation bypass mode may be used for losslessly encoding the frame data 310 in the encoded bitstream 312. Use of the transform quantisation bypass mode is controlled at the coding unit (CU) level, allowing portions of the frame data 310 to be losslessly encoded. The availability of the transform quantisation bypass mode is controlled via 'high level syntax', enabling the signalling overhead of controlling transform quantisation bypass mode to be removed in cases where lossless encoding is not required in any portion of the frame data 310. High level syntax refers to portions of the encoded bitstream 312 that are generally encoded infrequently. High level syntax is used to describe properties of the bitstream 312 (e.g. to restrict or otherwise configure particular coding tools used in the video encoder 114 and the video decoder 134). Examples of high level syntax include 'sequence parameter sets', 'picture parameter sets' and 'slice headers'.

For the high efficiency video coding (HEVC) standard, conversion of the residual sample array 360 to the frequency domain representation is implemented using a transform such as a modified discrete cosine transform (DCT). In such transforms, the modification permits implementation using shifts and additions instead of multiplications. The modifications enable reduced implementation complexity compared to a conventional discrete cosine transform (DCT). In addition to the modified discrete cosine transform (DCT), a modified discrete sine transform (DST) may also be used in specific circumstances. Various sizes of the residual sample array 360 and scaled transform coefficients 362 are possible, in accordance with supported transform sizes. In the high efficiency video coding (HEVC) standard, transforms are performed on two dimensional (2D) arrays of data samples having sizes, such as 32×32, 16×16, 8×8 and 4×4. Thus, a predetermined set of transform sizes are available to the video encoder 114. Moreover, the set of transform sizes may differ between the luma channel and the chroma channels.

Transforms may be applied to both the luma and chroma channels. Differences between the handling of luma and chroma channels with regard to transform units (TUs) exist. Each residual quad-tree occupies one coding unit (CU) and is defined as a quad-tree decomposition of the coding unit (CU) into a hierarchy including one transform unit (TU) at each leaf node of the residual quad-tree hierarchy. Each transform unit (TU) has dimensions corresponding to one of the supported transform sizes. At each level of the residual quad-tree hierarchy a 'coded block flag value' signals possible presence of a transform in each colour channel. The signalling may indicate presence of a transform at the current hierarchy level (when no further splits are present), or that lower hierarchy levels may contain at least one transform among the resulting transform units (TUs). When the coded block flag value is zero, all residual coefficients at the present or lower hierarchy levels are known to be zero. In such a case, no transform is required to be performed for the corresponding colour channel of any transform units (TU) at the present hierarchical level or at lower hierarchical levels. When the coded block flag value is one, if the present region is not further sub-divided then the region contains a transform which requires at least one non-zero (i.e. significant) residual coefficient. If the present region is further sub-divided, a coded block flag value of one indicates that each resulting sub-divided region may include non-zero residual coefficients. In this manner, for each colour channel, zero or more transforms may cover a portion of the area of the coding unit (CU) varying from none up to the entirety of the coding unit (CU). Separate coded block flag values exist for each colour channel. Each coded block flag value is not required to be encoded, as cases exist where there is only one possible coded block flag value.

For a given transform block (TB), the transform may be performed, or the transform may be skipped. In such 'transform skip' blocks, the residual coefficients provide a spatial domain representation. The 'transform skip' mode is generally selected for screen content, as the transform skip mode can achieve higher compression efficiency of high frequency (discontinuous tone) information than can be achieved by the modified integer discrete cosine transform (DCT). As the transform skip operation is signalled for each transform block (TB), for a given transform unit (TU), signalling of transform skip is provided independently for each colour channel.

The scaled transform coefficients 362 are input to the quantiser module 322 where data sample values thereof are scaled and quantised, according to a determined quantisation parameter 384, to produce transform coefficients 364. The transform coefficients 364 are an array of values having the same dimensions as the residual sample array 360. The transform coefficients 364 provide a frequency domain representation of the residual sample array 360 when a transform is applied. When the transform is skipped, the transform coefficients 364 provide a spatial domain representation of the residual sample array 360 (i.e. quantised by the quantiser module 322 but not transformed by the transform module 320). For the discrete cosine transform (DCT), the upper-left value of the transform coefficients 364 specifies a 'DC' value for the residual sample array 360 and is known as a 'DC coefficient'. The DC coefficient is representative of the 'average' of the values of the residual sample array 360. Other values in the transform coefficients 364 specify 'AC coefficients' for the residual sample array 360. The scale and quantisation results in a loss of precision, dependent on the value of the determined quantisation parameter 384. A higher value of the determined quantisation parameter 384 results in greater information being lost from the residual data and more blocking artefacts being present in reconstructed samples 370. The loss of information increases the compression achieved by the video encoder 114, as there is less information to encode. This increase in compression efficiency occurs at the expense of reducing the visual quality of output from the video decoder 134. The determined quantisation parameter 384 may be adapted during encoding of each frame of the frame data 310. Alternatively, the determined quantisation parameter 384 may be fixed for a portion of the frame data 310. In one arrangement, the determined quantisation parameter 384 may be fixed for an entire frame of frame data 310. Other adaptations of the determined quantisation parameter 384 are also possible, such as quantising different residual coefficients with separate values.

The transform coefficients 364 and determined quantisation parameter 384 are taken as input to dequantiser module 326. The dequantiser module 326 reverses the scaling performed by the quantiser module 322 to produce rescaled transform coefficients 366. The rescaled transform coefficients 366 are rescaled versions of the transform coefficients 364. The transform coefficients 364, the determined quantisation parameter 384 and prediction mode 386 are also taken as input to an entropy encoder module 324. The entropy encoder module 324 encodes the values of the transform coefficients 364 in an encoded bitstream 312 (or 'video bitstream'). Due to the loss of precision resulting from the operation of the quantiser module 322, the rescaled transform coefficients 366 are not identical to the original values in the scaled transform coefficients 362. The rescaled transform coefficients 366 from the dequantiser module 326 are then output to an inverse transform module 328. The inverse transform module 328 performs an inverse transform from the frequency domain to the spatial domain to produce a spatial-domain representation 368 of the rescaled transform coefficients 366. The spatial-domain representation 368 is substantially identical to a spatial domain representation that is produced at the video decoder 134. The spatial-domain representation 368 is then input to a summation module 342.

A motion estimation module 338 produces motion vectors 374 by comparing the frame data 310 with previous frame data from one or more sets of frames stored in a frame buffer module 332, generally configured within the memory 206. The sets of frames are known as 'reference picture lists'. The motion vectors 374 are then input to a motion compensation module 334 which produces an inter-predicted prediction unit (PU) 376 by filtering data samples stored in the frame buffer module 332, taking into account a spatial offset derived from the motion vectors 374. Not illustrated in FIG. 3, the motion vectors 374 are also passed to the entropy encoder module 324 for encoding in the encoded bitstream 312. The motion vectors are encoded as 'motion vector differences', i.e. differences between magnitudes of the motion vector for a current block and a neighbouring block.

Intra-frame prediction module 336 produces an intra-predicted prediction unit (PU) 378 using reconstructed samples 370 obtained from the summation module 342. In particular, the intra-frame prediction module 336 uses samples from neighbouring blocks that have already been decoded to produce intra-predicted samples for the current prediction unit (PU). When a neighbouring block is not available (e.g. at the frame boundary) the neighbouring samples are considered as 'not available' for reference. In such cases, a default value is used instead of the neighbouring sample values. Typically, the default value (or 'half-tone') is equal to half of the range implied by the bit-depth. For example, when the video encoder 114 is configured for a bit-depth of eight (8), the default value is one hundred and twenty eight (128). The summation module 342 sums prediction unit (PU) 382 from the multiplexer module 340 and the spatial domain output of the multiplexer 382.

An intra-block copy module 350 tests various block vectors to produce an optimal reference block for the prediction unit (PU) 382, which may be referred to as intra-block copied prediction units. The reference block includes either a block from the reconstructed samples 370 obtained from the current coding tree block (CTB) and/or the previous coding tree block (CTB) or samples from the frame buffer 332. Multiplexor 352 selects between the block of reconstructed samples 370 and the samples from the frame buffer 332 based on a provided block vector. The reference block cannot include samples from any coding blocks (CBs) in the current coding tree block (CTB) that have not yet been decoded (and hence are not available in the reconstructed samples 370). A block vector is a two-dimensional vector specifying the location of a reference block relative to the location of the currently considered prediction unit (PU). The block vector includes a horizontal component (i.e. 'X component') and a vertical component (i.e. 'Y component'). The intra-block copy module 350 may test every valid block vector by conducting a search using a nested loop. Faster searching methods are also possible. The intra-block copy module 350 may reduce the search complexity by only searching for block vectors aligned horizontally or vertically to the current coding block (CU), near-horizontal and near-vertical block vectors may also be searched. The intra-block copy module 350 may test a spatially sparse set of block vectors and then perform a refined search in the neighbourhood of the optimal one of the sparse block vectors to produce a final block vector.

Prediction units (PUs) may be generated using either an intra-prediction, an inter-prediction, an intra-block copy method or using palette prediction. Intra-prediction methods make use of data samples adjacent to the prediction unit (PU) that have previously been decoded (typically above and to the left of the prediction unit) in order to generate reference data samples within the prediction unit (PU). Various directions of intra-prediction are possible (33 directions in total); additionally, a 'DC mode' and a 'planar mode' are supported, for a total of thirty-five (35) possible intra-prediction modes. Inter-prediction methods make use of a motion vector to refer to a block from a selected reference frame. The motion estimation module 338 and motion compensation module 334 operate on motion vectors 374, having a precision of one quarter (¼) of a luma sample, enabling precise modelling of motion between frames in the frame data 310. Intra-block copy methods make use of a block vector to reference a block of samples from samples that have previously been decoded in the current frame. Block vectors are defined at integer pixel precision.

Palette prediction populates a prediction unit (PU) with samples obtained from a 'palette' using a series of 'run' operations and 'copy' operations. A run operation populates the prediction unit (PU) in raster scan order using a colour available in the palette. A copy operation populates the prediction unit (PU) in raster scan order by copying a value from neighbouring samples in the prediction unit (PU) to the current sample. The entirety of the prediction unit (PU) is populated in raster scan order using a combination of run and copy operations. The ability to specify prediction unit (PU) contents with high precision from a palette of colours makes the palette prediction mode highly beneficial for screen content.

The decision on which of the intra-prediction, the inter-prediction, the intra-block copy or the palette prediction method to use is made according to a rate-distortion trade-off. The trade-off is made between the desired bit-rate of the resulting encoded bitstream 312 and the amount of image quality distortion introduced by the prediction method. If intra-prediction is used, one intra-prediction mode is selected from the set of possible intra-prediction modes, also according to a rate-distortion trade-off. The multiplexer module 340 may select either the intra-predicted reference samples 378 from the intra-frame prediction module 336, or the inter-predicted prediction unit (PU) 376 from the motion compensation block 334 or intra-block copied samples from the intra-block copy module 350 or palette predicted samples from a palette prediction module (not shown in FIG. 3). The multiplexor module 340 performs the selection according to the prediction mode 386.

The summation module 342 produces the reconstructed samples 370 that are input to a de-blocking filter module 330. The de-blocking filter module 330 performs filtering along block boundaries, producing de-blocked samples 372 that are written to the frame buffer module 332 configured within the memory 206. The frame buffer module 332 is a buffer with sufficient capacity to hold data from one or more past frames for future reference as part of a reference picture list.

The entropy encoder 324 encodes the transform coefficients 364, the prediction mode 386, the motion vectors (or motion vector differences) and other parameters, collectively referred to as 'syntax elements', into the encoded bitstream 312 by performing a context adaptive binary arithmetic coding (CABAC) algorithm. Syntax elements are grouped together into 'syntax structures'. The groupings may contain recursion to describe hierarchical structures. In addition to ordinal values, such as an intra-prediction mode or integer values, such as a motion vector, syntax elements also include flags, such as to indicate a quad-tree split.

Although the video decoder 134 of FIG. 4 is described with reference to a high efficiency video coding (HEVC) video decoding pipeline, other video codecs may also employ the processing stages of modules 420-434. The encoded video information may also be read from memory 206, the hard disk drive 210, a CD-ROM, a Blu-ray Disk™ or other computer readable storage medium. Alternatively the encoded video information may be received from an external source, such as a server connected to the communications network 220 or a radio-frequency receiver.

As seen in FIG. 4, received video data, such as the encoded bitstream 312, is input to the video decoder 134. The encoded bitstream 312 may be read from memory 206, the hard disk drive 210, a CD-ROM, a Blu-ray Disk™ or other computer readable storage medium. Alternatively the encoded bitstream 312 may be received from an external source such as a server connected to the communications network 220 or a radio-frequency receiver. The encoded bitstream 312 contains encoded syntax elements representing the captured frame data to be decoded.

The encoded bitstream 312 is input to an entropy decoder module 420 which extracts the syntax elements from the encoded bitstream 312 and passes the values of the syntax elements to other blocks in the video decoder 134. The entropy decoder module 420 applies the context adaptive binary arithmetic coding (CABAC) algorithm to decode syntax elements from the encoded bitstream 312. The decoded syntax elements are used to reconstruct parameters within the video decoder 134. Parameters include zero or more residual data array 450, motion vectors 452 (motion vector differences are decoded from the encoded bitstream 312 and the motion vectors 452 are derived from the motion vector differences), a prediction mode 454. The residual data array 450 is passed to a dequantiser module 421, the motion vectors 452 are passed to a motion compensation module 434, and the prediction mode 454 is passed to an intra-frame prediction module 426 and to a multiplexer 428.

The dequantiser module 421 performs inverse scaling on the residual data of the residual data array 450 to create reconstructed data 455 in the form of transform coefficients. The dequantiser module 421 outputs the reconstructed data 455 to an inverse transform module 422. The inverse transform module 422 applies an 'inverse transform' to convert the reconstructed data 455 (i.e., the transform coefficients) from a frequency domain representation to a spatial domain representation, outputting a residual sample array 456. The inverse transform module 422 performs the same operation as the inverse transform module 328. The inverse transform module 422 is configured to perform an inverse transform. The transforms performed by the inverse transform module 422 are selected from a predetermined set of transform sizes required to decode an encoded bitstream 312 that is compliant with the high efficiency video coding (HEVC) standard.

The motion compensation module 434 uses the motion vectors 452 from the entropy decoder module 420, combined with reference frame data 460 from a frame buffer block 432, configured within the memory 206, to produce an inter-predicted prediction unit (PU) 462 for a prediction unit (PU). The inter-prediction prediction unit (PU) 462 is a prediction of output decoded frame data based upon previously decoded frame data. When the prediction mode 454 indicates that the current prediction unit (PU) was coded using intra-prediction, the intra-frame prediction module 426 produces an intra-predicted prediction unit (PU) 464 for the prediction unit (PU). The intra-prediction prediction unit (PU) 464 is produced using data samples spatially neighbouring the prediction unit (PU) and a prediction direction also supplied by the prediction mode 454. The spatially neighbouring data samples are obtained from reconstructed samples 458, output from a summation module 424. An intra-block copy module 436 produces a block of reference samples 438, by using a multiplexor 440 to copy an array of samples from either the current and/or the previous coding tree blocks (CTBs) or from the frame buffer 432. The offset of the reference samples is calculated by adding a block vector (decoded by the entropy decoder 420) to the location of the current coding block (CB) within the current coding tree block (CTB). For block vectors indicating a reference block located outside of the current and previous coding tree block (CTB), the multiplexor 440 selects samples from the frame buffer 432, otherwise the multiplexor selects samples from reconstructed samples 458. The multiplexer module 428 selects a prediction unit (PU) 466 from either the intra-predicted prediction unit (PU) 464, or the inter-predicted prediction unit (PU) 462, or a reference block 438 from the intra-block copy module 436, or a palette prediction from a palette prediction module (not shown in FIG. 4), depending on the current prediction mode 454. The prediction unit (PU) 466, which is output from the multiplexer module 428, is added to the residual sample array 456 from the inverse scale and transform module 422 by the summation module 424 to produce reconstructed samples 458. The reconstructed samples 458 is then input to each of a de-blocking filter module 430, the intra-frame prediction module 426 and the intra-block copy module 436. The de-blocking filter module 430 performs filtering along data block boundaries, such as transform unit (TU) boundaries, to smooth visible artefacts. The output of the de-blocking filter module 430 is written to the frame buffer module 432 configured within the memory 206. The frame buffer module 432 provides sufficient storage to hold one or more decoded frames for future reference. Decoded frames 412 are also output from the frame buffer module 432 to a display device, such as the display device 136 (e.g., in the form of the display device 214).

Figure 5A:
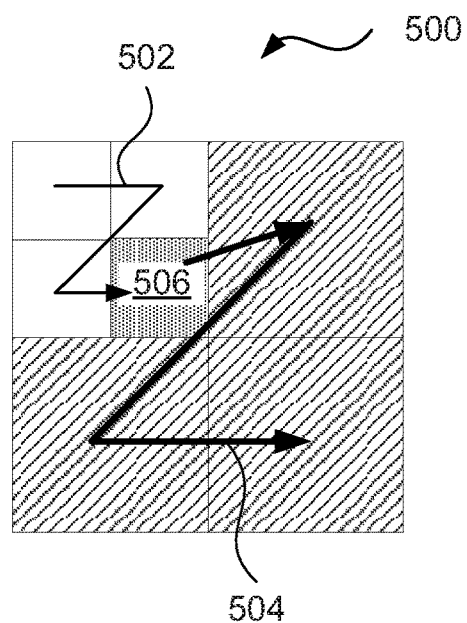
FIG. 5A is a schematic block diagram showing an example 'Z-scan' order for scanning coding blocks (CBs) within a coding tree block (CTB)

FIG. 5A is a schematic block diagram showing an example 'Z-scan' order for scanning coding blocks (CBs) within a coding tree block (CTB) 500. At each level of a hierarchical decomposition of the coding tree block (CTB) 500, a scan resembling a 'Z' is performed, i.e. from left to right, and then from top to bottom. The scans are applied recursively in a depth-first manner. In the example of FIG. 5A, four coding blocks (CBs) in a top-left of the coding tree block (CTB) 500 are scanned as in a Z-scan order (e.g. 502), reaching a coding block (CB) 506 that is currently being processed in the example of FIG. 5A. The remainder of the coding tree block (CTB) 500 is scanned according to Z-scan order 504. The samples from previously decoded coding blocks (CBs) in the coding tree block (CTB) 500 are available for intra-prediction. The samples from the coding blocks (CBs) that have not yet been decoded by the video decoder 134 are not available for intra-prediction and are illustrated with diagonal hatching in FIG. 5A. As such, the video encoder 114 also treats the samples from the coding blocks (CBs) that have not yet been decoded as not being available for intra-block copy.

Figure 5B:
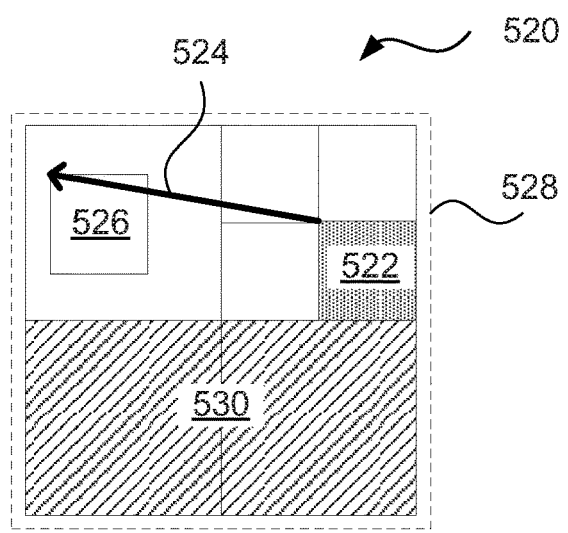
FIG. 5B is a schematic block diagram showing an example intra-block copy operation.

FIG. 5B is a schematic block diagram showing an example intra-block copy operation. In the example intra-block copy operation, coding block (CB) 522 is configured to use intra-block copy mode. A block vector 524 references a reference block 526 of samples relative to a top-left sample position of the coding block (CB) 522 in a current coded tree block (CTB) 528 used to reconstruct coding block (CB) 522. In the example of FIG. 5B, region 530 of the current coded tree block (CTB) 528 have not yet been decoded because the region 530 are subsequent to the coding block (CB) 522 in the Z-scan order. The region 530 is thus not available for referencing. In the example of FIG. 5B, the reference block 526 is contained entirely within current coding tree block (CTB) 528, where a previous coding tree block (CTB) is not shown.

The memory capacity of the intra-block copy module 350 in the video encoder 114 and the intra-block copy module 436 in the video decoder 134 is sufficient to hold luma and chroma samples of two coding tree blocks (CTBs), with a coding tree block (CTB) size configured as 64×64 luma samples and corresponding dimensions for chroma in accordance with the selected chroma format.

Figure 6:
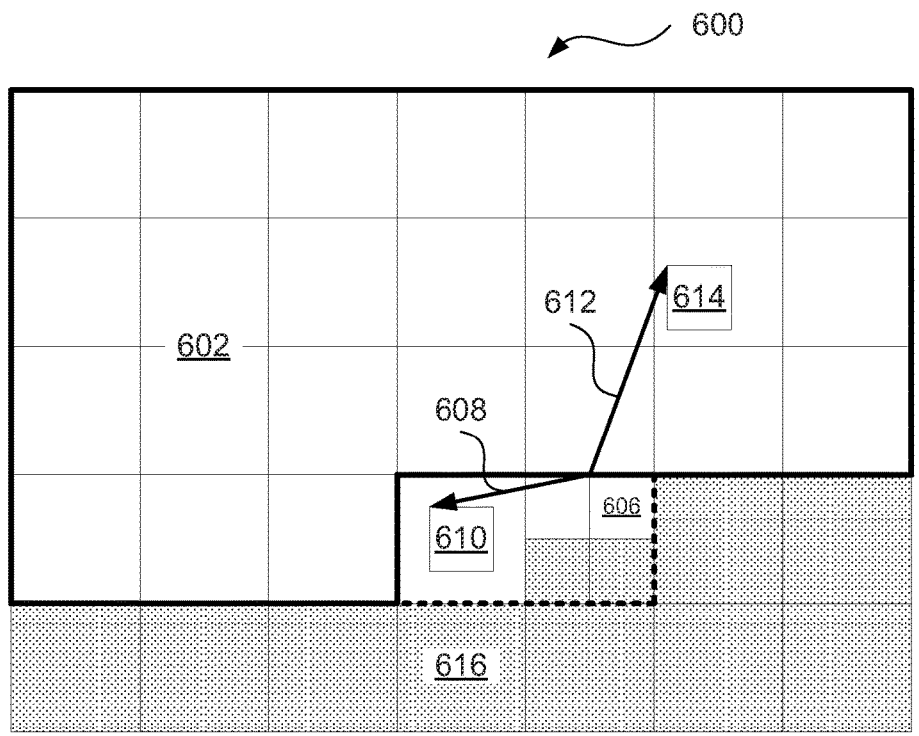
FIG. 6 is a schematic block diagram showing an example frame with a region of reconstructed samples

FIG. 6 is a schematic block diagram showing an example frame of video data 600 divided into a local and a far region for intra-block copy. A coding unit (CU) 606 is configured to use intra-block copy. Two example block vectors are shown for the coding unit (CU) 606. A first block vector 608 references a reference block 610. The reference block 610 is located in the coding tree unit (CTU) prior (in raster scan order) to the coding tree unit (CTU) containing the coding unit (CU) 606. As such, the reference block 610 is contained in on-chip memory and accessed by the multiplexor 352 selecting a block from the reconstructed samples 370 in the video encoder 114 or the multiplexor 440 selecting a block from the reconstructed samples 458 in the video decoder 134. A second block vector 612 references a reference block 614. The reference block 614 is located in a coding tree unit (CTU) that is not the current or previous coding tree unit (CTU) in raster scan order. As such, the reference block 610 is contained in off-chip memory. The reference block 610 is accessed by the multiplexor 352 selecting a block from the frame buffer 330 in the video encoder 114 or the multiplexor 440 selecting a block from the frame buffer 430 in the video decoder 134. In the video decoder 134, the frame 600 is in the process of being decoded and thus not all samples in the frame 600 are available for selection by the multiplexor 440. Region 602 shows the coding tree units (CTUs) previously decoded in the frame 600. Generally, the region 602 is available for selection by the multiplexor 440. It is possible that one or more coding tree units (CTUs) prior to the coding tree unit (CTU) containing the coding unit (CU) 606 are not available, due to pipeline delays in the de-blocking filter 430.

Figure 7:
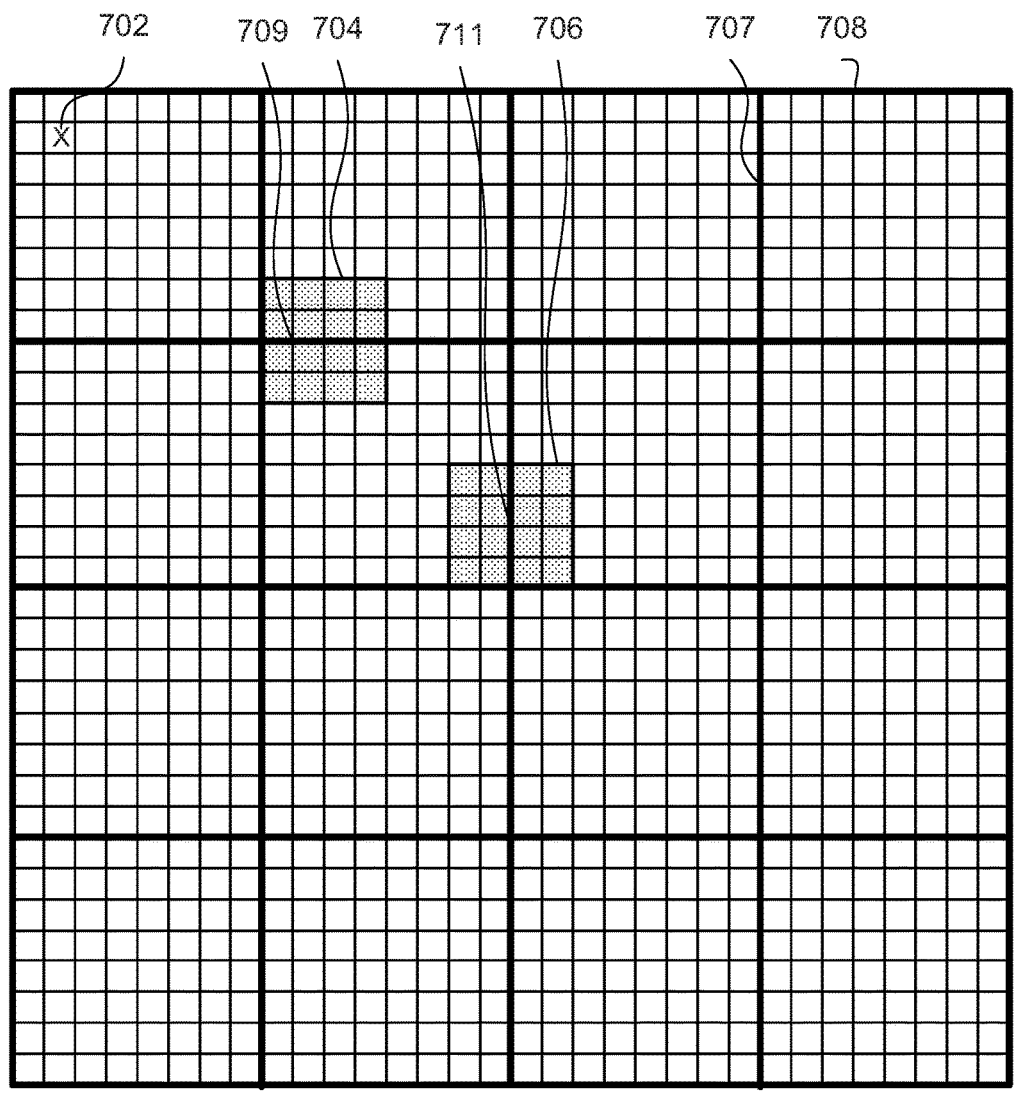
FIG. 7 is a schematic block diagram showing examples of horizontal and vertical edges within a portion of a frame.

FIG. 7 is a schematic block diagram showing examples of horizontal and vertical edges within a frame portion 700. The frame portion 700 includes a primary colour channel and at least one secondary colour channel. The colour channel includes an array of samples, such as a sample 702. Each sample has a numerical value, with a range dependent on the bit-depth of the considered colour channel. The frame portion 700 is divided into a grid of 8×8 blocks. A de-blocking filtering process is performed only along edges of the grid. The grid includes horizontal edges, such as edge 708, and vertical edges, such as edge 707. Along each edge (e.g., 708) on the 8×8 grid, a 'boundary strength' is defined. Then, a 'filter strength' is derived from the boundary strength and the quantisation parameter of the blocks adjacent to the considered edge. The de-blocking filtering process differs between the primary colour channel and the secondary colour channels and is further described below with reference to FIG. 9. The quantisation parameter may vary down to a 4×4 block granularity. Thus, the filter strength may also vary down a granularity of each four samples on the 8×8 grid. Consequently, along one eight (8)-sample edge, two different filter strengths for each group of four samples are possible. Each edge is an interface between two adjacent blocks and thus has two 'sides'. For a horizontal edge 709, shaded samples 704, occupying a portion of the block above the horizontal edge 709 and a portion of the block below the horizontal edge 709, are used as input to the de-blocking filter process for the horizontal edge 709. For a vertical edge 711, shaded samples 706, occupying a portion of the block to the left of the vertical edge 711 and the block to the right of the vertical edge 711, are used as input to the de-blocking filter process for the vertical edge 711.

Figure 8:
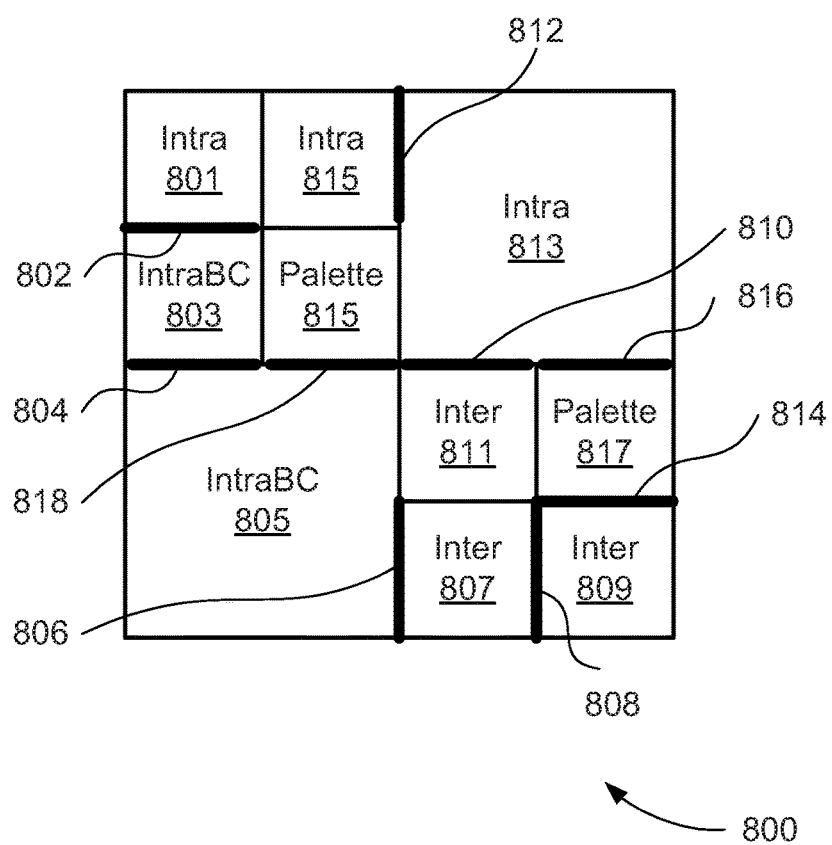
FIG. 8 is a schematic block diagram showing examples of edge types resulting from the prediction modes of prediction units (PUs) on either side of the respective edge.

FIG. 8 is a schematic block diagram showing examples of edge types resulting from the prediction modes of prediction units (PUs) on either side of the respective edge. A coding tree block (CTB) 800 includes multiple prediction units (PUs) having a variety of sizes and prediction modes. In the example of FIG. 8, coding tree block (CTB) 800 includes edges with each combination of prediction modes for the prediction units (PUs) on each side of the edge. An edge 802 exists between an intra-predicted prediction unit (PU) 801 and an intra-block copied prediction unit (PU) 803. An edge 804 exists between the intra-block copied prediction unit (PU) 803 and an intra-block copied prediction unit (PU) 805. An edge 806 exists between intra-block copied prediction unit (PU) 805 and an inter-predicted prediction unit (PU) 807. An edge 808 exists between the inter-predicted prediction unit (PU) 807 and an inter-predicted prediction unit (PU) 809. An edge 810 exists between an inter-predicted prediction unit (PU) 811 and an intra-predicted prediction unit (PU) 813. An edge 812 exists between the intra-predicted prediction unit (PU) 813 and an intra-predicted prediction unit (PU) 815. An edge 814 exists between the inter-predicted prediction unit (PU) 809 and palette-predicted prediction unit (PU) 817. An edge 816 exists between the intra-predicted prediction unit (PU) 813 and the palette-predicted prediction unit (PU) 817. An edge 818 exists between the intra-block copy predicted prediction unit (PU) 805 and a palette-predicted prediction unit (PU) 815.

Not shown in FIG. 8, another type of edge exists between two adjacent prediction units (PUs) where each prediction unit (PU) uses palette prediction. As shown in FIG. 8, with four prediction modes (i.e. intra-prediction, inter-prediction, intra-block copy and palette mode), ten types of edge (i.e. 802, 804, 806, 808, 810, 812, 814, 816 and 818 and a palette to palette edge not shown in FIG. 8) are possible between adjacent prediction units (PUs). Moreover, edges also exist within prediction units (PUs) down to an 8×8 sample grid granularity, however such edges are not de-blocked.

Also not shown in FIG. 8 are edges between transform units (TUs). The edges between transform units (TUs) are marked for de-blocking. Generally, an array of edge flags is used to signal which edges are to be de-blocked and which edges are not to be de-blocked. The horizontal edges and the vertical edges are considered separately (e.g. via two passes of the de-blocking filter, with corresponding passes for determining the associated edge flags).

Figure 9:
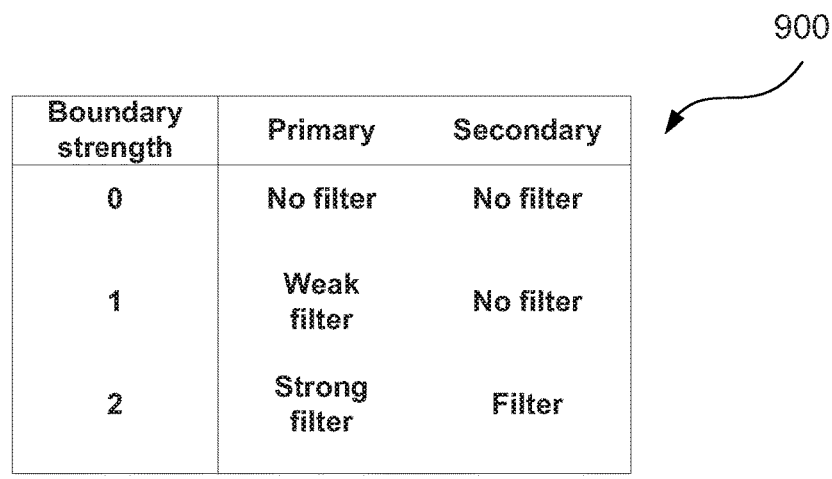
FIG. 9 is a table showing filter strength setting for different colour channels and boundary strength values.

FIG. 9 is a table 900 showing filter strength setting for different colour channels and boundary strength values. Three boundary strength values are defined (i.e. zero, one and two). A boundary strength value of zero indicates that de-blocking is not applied to the considered edge in the primary colour channel and the secondary colour channel(s). A boundary strength value of one indicates that a 'weak' filter is applied to the considered edge in the primary colour channel and no filtering is applied to the considered edge in the secondary colour channel(s). A boundary strength value of two (2) indicates that a 'strong' filter is applied to the considered edge in the primary colour channel and filtering is applied to the considered edge in the secondary colour channel(s). For edges along the 8×8 sample grid with an edge flag set to zero (0), i.e. edges that do not lie on the boundary of two prediction units (PUs) or two transform units (TUs), the boundary strength value is implicitly set to zero. The 'strength' of the de-blocking filter is dependent on the quantisation parameter of the transform units (TUs) on either side of the considered edge. For a given quantisation parameter value, two filter strengths are supported when filtering is applied, a 'strong' filter and a 'weak' filter. The 'strong' filter at a given quantisation parameter value corresponds to the 'weak' filter at a lower quantisation parameter value.

Figure 10A:
FIG. 10A is a table showing a rule for setting the boundary strength for an edge according to the prediction modes of the prediction units (PUs) of each side of the edge.

FIG. 10A is a table 1000 showing a rule for setting the boundary strength for an edge according to the prediction modes of the prediction units (PUs) of each side of the edge. The rule is summarised in the table 1000 and is defined as follows. The table 1000 takes the prediction mode of two adjacent blocks and indicates the boundary strength along the edge between the two adjacent blocks. For a horizontal edge, the prediction units (PUs) are above and below the considered edge. For a vertical edge, the prediction units (PUs) are to the left or to the right of the considered edge.

In the rule of FIG. 10A, if either block has a prediction mode of intra-prediction, intra-block copy or palette mode, then the boundary strength is set to two. Otherwise (i.e. both blocks have a prediction mode of inter-prediction), the boundary strength is set to one (1) when one or more of the following conditions are met:
  (a) At least one non-zero (i.e. significant) residual coefficient is present in either transform block (TB), as indicated by either or both of the coded block flags of the transform blocks (TBs) on either side of the considered edge signalling the presence of at least one significant residual coefficient in the corresponding transform block (TB);
  (b) Different reference images are used for each block or a different number of motion vectors are used for each block;
  (c) One motion vector is used for each block and the absolute difference between the two motion vectors is greater than four quarter luma samples;
  (d) Two motion vectors are used for each block and the same two reference pictures are used for each block and the absolute difference between each pair of motion vectors is greater than four quarter luma samples.

If none of conditions (a), (b), (c) and (d) above are met, then the boundary strength for the considered edge is set to zero (0).

In the rule of table 1000, strong filtering is applied in the primary colour channel and filtering is applied in the secondary colour channel(s) for edges between blocks where either block uses intra-prediction or intra-block copy. Intra-predicted prediction units (PUs) are used often for 'natural content', i.e. when no reference frame is available. The intra-prediction process uses samples from blocks neighbouring the current prediction unit (PUs) to produce the predicted samples of the prediction unit (PU). Due to the limited information determined from the samples of the blocks neighbouring the prediction units (PUs), intra-predicted prediction units (PUs) almost always include residual information. For natural content, a transform is frequently applied to the residual information. For screen content as described above, the transform may be skipped, due to the presence of high frequency information that the transform is unable to compress efficiently. The prevalent use of a transformed residual with intra-prediction indicates that use of boundary strength value of two is appropriate. Intra-block copy mode and palette mode are rarely selected for natural content.

A minor coding efficiency improvement is observed when intra-block copy or palette mode is available for selection by the video encoder 114 when the frame data 310 is natural content (e.g. from an imaging sensor). For screen content, intra-block copy and palette mode are frequently selected. In particular, intra-block copy is often selected to copy a region with high frequency information. Such a region includes 'sharp' edges, and as such, applying a strong de-blocking filter may reduce coding efficiency, as the sharp edges are smoothed, resulting in a reduction in PSNR. In such cases, palette mode is also frequently selected, depending on the exact nature of the content and the availability of suitable reference blocks for use by the intra-block copy mode.

Figure 10B:
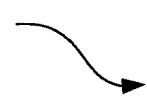
FIG. 10B is a table showing a rule for setting the boundary strength for an edge according to the prediction modes of the prediction units (PUs) of each side of the edge.

FIG. 10B is a table 1010 showing a rule for setting the boundary strength for an edge according to the prediction modes of the prediction units (PUs) of each side of the edge. The rule is summarised in the table 1010 and is defined as follows. The table 1010 takes the prediction mode of two adjacent blocks and indicates the boundary strength along the edge between the two adjacent blocks. In the rule of FIG. 10B, if either block has a prediction mode of intra-prediction, then the boundary strength is set to two (2). Otherwise, if both blocks have a prediction mode of intra-block copy, then the boundary strength is set to zero (0) if the block vectors corresponding to the two blocks are equal (i.e., the block vectors have equal magnitudes), and the boundary strength is set to one (1) if the block vectors corresponding to the two blocks are inequal. Otherwise, if either block has a prediction mode of intra-block copy or palette mode, then the boundary strength is set to one (1). Otherwise (i.e. both blocks have a prediction mode of inter-prediction), the boundary strength is set according to the conditions (a)-(d) as described above with reference to FIG. 10A.

In the rule of table 1010, if two adjacent blocks use intra-block copy prediction or the palette prediction mode or a combination of the intra-block copy and the palette prediction modes, the edge between the two adjacent blocks will use the boundary strength value of one resulting in a weak filter being applied in the primary colour channel and no filter in the secondary colour channel(s). As intra-block copy or palette mode are generally selected for regions of the frame of video data containing screen content, the weakening of the de-blocking filter reduces the smoothing effect on such regions, preserving the high-frequency (i.e. sharper edges) present in such regions. The rule of table 1010 improves compression efficiency compared to the rule of table 1000.

Figure 10C:
FIG. 10C is a table showing a rule for setting the boundary strength for an edge according to the prediction modes of the prediction units (PUs) of each side of the edge.

FIG. 10C is a table 1020 showing a rule for setting the boundary strength for an edge according to the prediction modes of the prediction units (PUs) of each side of the edge. The rule is summarised in the table 1020 and is defined as follows. The table 1020 takes the prediction mode of two adjacent blocks and indicates the boundary strength along the edge between the two adjacent blocks. In the rule of FIG. 10C, if either block has a prediction mode of intra-block copy or palette mode, then the boundary strength is set to one (1). Otherwise, if either block has a prediction mode of intra-prediction, then the boundary strength is set to two (2). Otherwise (i.e. blocks have a prediction mode of inter-prediction), the boundary strength is set according to the conditions (a)-(d) as described with reference to FIG. 10A.

In the rule of table 1020, if either block of two adjacent blocks uses intra-block copy or palette mode or a combination of the intra-block copy and palette prediction modes, the edge between the two adjacent blocks will use the boundary strength value of one (1), resulting in a weak filter being applied in the primary colour channel and no filter being applied in the secondary colour channel(s). Compared to the rule of table 1010, the rule of table 1020 further reduces the application of the de-blocking filter for intra-block copy. As the intra-block copy or palette prediction modes are generally selected for regions of the frame of video data containing screen content, the weakening of the de-blocking filter reduces the smoothing effect on such regions, preserving the high-frequency (i.e. sharper edges) present in such regions. The rule of table 1020 further improves compression efficiency compared to the rule of table 1010.

FIG. 11 is a schematic flow diagram showing a method 1100 for setting a boundary strength value for a de-blocking filter. The method 1100 results in setting the boundary strength value in accordance with the rule of the table 1010. The method 1100 may be implemented as one or more software code modules implementing the video encoder 114 or the video decoder 134, which are resident on the hard disk drive 210 and are controlled in their execution by the processor 205. The method 1100 is performed in both the video encoder 114 and the video decoder 134. The method 1100 will be described with reference to the video encoder 114 and the de-blocking filter module 330. However, the description of the method 1100 also applies to the video decoder 134 and the de-blocking filter module 430. The method 1100 is performed for each edge in the frame data 310, down to an 8×8 block granularity.

An initial transform and coded block flag test step 1101 is performed by the processor 205 in a particular arrangement of the video encoder 114. The initial transform and coded block flag test step 1101 is also performed by the processor 205 in a particular arrangement of the video decoder 134. Step 1101 will be described in further detail below.

At an intra test step 1102, the de-blocking filter module 330, under control of the processor 205, tests the prediction mode of the prediction units (PUs) on either side of a considered edge. Similarly, step 1102 is also performed by the de-blocking filter module 430 when the method 1100 is being performed by the video decoder 134. If either prediction mode is intra-prediction, then control in the processor 205 passes to a boundary strength two step 1104. Otherwise (i.e. if both prediction modes are not intra-prediction) then control in the processor 205 passes to an intra-block copy or palette mode test step 1105.

At the boundary strength two step 1104, the de-blocking filter module 330, under control of the processor 205, sets the boundary strength value for the considered edge to two. The method 1100 then terminates. Again, step 1104 is also performed by the de-blocking filter module 430 when the method 1100 is being performed by the video decoder 134.

At the intra-block copy or palette mode test step 1105, the de-blocking filter module 330, under control of the processor 205, tests the prediction mode of the prediction units (PUs) on either side of the considered edge. If either prediction mode is intra-block copy or palette mode, then control in the processor 205 passes to a block vector test step 1107. Otherwise (i.e. if both prediction modes are inter-prediction) then control in the processor 205 passes to a transform and coded block flag value test step 1106. Again, step 1105 is also performed by the de-blocking filter module 430 when the method 1100 is being performed by the video decoder 134.

At the coded block flag value test step 1106, the de-blocking filter module 330, under control of the processor 205, tests the coded block flags of the luma transform blocks (TB) along either side of the considered edge. If either transform block (TB) includes at least one significant residual coefficient (i.e. the corresponding coded block flag has a value of one) then control in the processor passes to the boundary strength one step 1110. Otherwise (i.e. both luma transform blocks (TBs) have no significant residual coefficients) control passes to a reference picture and motion vector test step 1108. Again, step 1106 is also performed by the de-blocking filter module 430 when the method 1100 is being performed by the video decoder 134.

At the block vector test step 1107, the de-blocking filter module 330, under control of the processor 205, tests the prediction mode of the prediction units (PUs) on either side of the considered edge. If the prediction modes are both intra-block copy, then the block vectors of the two prediction units (PUs) are compared. If the block vectors are equal (i.e., the block vectors have equal magnitudes), then control in the processor 205 passes to boundary strength zero step 1112. Otherwise (i.e., the block vectors are not equal), control in the processor 205 passes to the boundary strength one step 1110. Again, step 1107 is also performed by the de-blocking filter module 430 when the method 1100 is being performed by the video decoder 134.

At the reference picture and motion vector test step 1108, the de-blocking filter module 330 (or the de-blocking filter module 430 when the method 1100 is being performed by the video decoder 134), under control of the processor 205, tests the following conditions of each prediction unit (PU):

(a) Different reference pictures are used for each prediction unit (PU) or a different number of motion vectors are used for each prediction unit (PU);

(b) One motion vector is used for each prediction unit (PU) and the absolute difference between the two motion vectors is greater than four quarter luma samples;

(c) Two motion vectors are used for each prediction unit (PU) and the same two reference pictures are used for each block and the absolute difference between each pair of motion vectors is greater than four quarter luma samples.

If any of the conditions (a)-(c) are met, control in the processor 205 passes to the boundary strength one step 1110. Otherwise (i.e. none of the conditions (a)-(c) are met), control in the processor 205 passes to a boundary strength zero step 1112.

At the boundary strength one step 1110, the de-blocking filter module 330 (or the de-blocking filter module 430 when the method 1100 is being performed by the video decoder 134), under control of the processor 205, sets the boundary strength value for the considered edge to one. The method 1100 then terminates.

At the boundary strength zero step 1112, the de-blocking filter module 330 (or the de-blocking filter module 430 when the method 1100 is being performed by the video decoder 134), under control of the processor 205, sets the boundary strength value for the considered edge to zero. The method 1100 then terminates.

In one arrangement of the video encoder 114 and the video decoder 134, the method 1100 is modified such that the initial transform and coded block flag test step 1101 is performed before the intra test step 1102. At the initial transform and coded block flag test step 1101, control is passed to the boundary strength zero step 1112 if both prediction units (PUs) have at least one significant residual coefficient (i.e. the corresponding coded block flag has a value of one) and the prediction unit did not use a transform, i.e. 'transform skip' was enabled for the considered prediction unit (PU). In such arrangements, the de-blocking filter is not applied between adjacent blocks using transform skip, even if significant residual coefficients are present. As transform skip is likely to be selected for screen content, omission of applying the de-blocking filter prevents unintended smoothing of such content. A small coding efficiency improvement is achieved when the de-blocking filter is not applied between adjacent blocks using transform skip.

In another arrangement of the video encoder 114 and the video decoder 134, the initial transform and coded block flag value test step 1101 is modified such that control passes to the boundary strength zero step 1112 if either or both prediction units (PUs) have at least one significant residual coefficient (i.e. coded block flag is equal to one) and the transform block (TB) in the luma channel (i.e. the primary colour channel) corresponding to the prediction unit (PU) did not use a transform, i.e. 'transform skip' was enabled for the considered transform block (TB). In such arrangements, the de-blocking filter is not applied between adjacent blocks where at least one of the blocks uses transform skip, even if significant residual coefficients are present. As transform skip is likely to be selected for screen content, omission of applying the de-blocking filter prevents unintended smoothing of such content and a small coding efficiency improvement is achieved.

In yet another arrangement of the video encoder 114 and the video decoder 134, the initial transform and coded block flag value test step 1101 is modified such that the following rule is applied to determine the boundary strength: Let P represent the transform unit (TU) or prediction unit (PU) on one side of the considered edge and let Q represent the transform unit (TU) or prediction unit (PU) on the other side of the considered edge. Two variants are available that If the following expression evaluates as true, then control in the processor 205 passes the boundary strength zero step 1112, otherwise control passes to the step 1102:

Variation 1: (CBF(P) is equal to zero or TS(P)) and (CBF(Q) is equal to zero or TS(Q) and (Intra(P) or IBC(P) and Intra(Q) or IBC(Q))

Variation 2: (CBF(P) is equal to zero or TS(P)) and (CBF(Q) is equal to zero or TS(Q) and (IBC(P) or IBC(Q))

where CBF(x) is equal to the coded block flag of the luma transform block (TB) associated with block 'x'; TS(x) is equal to the transform skip flag of the luma transform block (TB) associated with block 'x'; Intra(x) indicates that the prediction mode of the prediction unit (PU) associated with block 'x' is intra-prediction; and IBC(x) indicates that the prediction mode of the prediction unit (PU) associated with block 'x' is intra-block copy. Such an arrangement disables deblocking along edges associated with transform skipped blocks, including where one side of the edge does not have any significant residual coefficients, and provides improved coding efficiency for regions of the frame that include screen content.

In yet another arrangement of the video encoder 114 and the video decoder 134, the block vector test step 1107 of the method 1100 is omitted. In arrangements where step 1107 is omitted, if processor 205 determines in the intra-block copy test step 1105 that either or both prediction units (PUs) along a given edge use intra-block copy, palette mode or a combination of the intra-block copy and palette prediction modes, control passes to the boundary strength one step 1110. In arrangements where step 1107 is omitted, the requirement to buffer block vectors of intra-block copy prediction units for determining the boundary strength of the de-blocking filter is removed. As such, block vectors are not accessed by the de-blocking module 330 in the video encoder 114 or the de-blocking module 430 in the video decoder 134. In arrangements where step 1107 is omitted, the rule described in table 1010 of FIG. 10B is modified such that the boundary strength value for an edge between two prediction units (PUs) each using intra-block copy is always one.

In yet another arrangement of the video encoder 114 and the video decoder 134, the step 1105 of FIG. 11 is modified as follows: If either prediction mode is intra-block copy or palette mode, then control in the processor 205 passes to the boundary strength zero step 1112. In arrangements comprising such a modified step 1105, for a given edge the de-blocking filter is disabled for the primary colour channel and the secondary colour channels if the prediction units (PUs) on either side of the edge are using intra-block copy mode or palette mode or a combination of these two prediction modes.

FIG. 12 is a schematic flow diagram showing a method 1200 for setting a boundary strength value for a de-blocking filter. The method 1200 results in setting the boundary strength value in accordance with the rule of the table 1020. The method 1200 may be implemented as one or more software code modules implementing the video encoder 114 or the video decoder 134, which are resident on the hard disk drive 210 and are controlled in their execution by the processor 205. The method 1200 is performed in both the video encoder 114 and the video decoder 134. However, the method 1200 will be described below with reference to the video encoder 114. The method 1200 is performed for each edge in the frame data 310, down to an 8×8 block granularity.

At the intra-block copy or palette mode test step 1201, the de-blocking filter module 330 (or the de-blocking filter module 430 when the method 1200 is being performed by the video decoder 134), under control of the processor 205, tests a first prediction mode of the prediction unit (PUs) on one side of the considered edge and a second prediction mode of the prediction unit (PU) on the other side of the considered edge. If either prediction mode is intra-block copy or palette mode, then control in the processor 205 passes to a boundary strength one step 1210. The test executed at step 1201 results in control passing to the boundary strength one step 1210 if the first prediction mode is intra-prediction and the second prediction mode is intra-block copy or palette mode, or the first prediction mode is intra-block copy or palette mode and the second prediction mode is intra. Step 1201 differs from the step 1102 of FIG. 11 in that the resulting boundary strength is one instead of two. As the test executed at step 1201 treats each edge symmetrically, the following definitions of the first prediction mode and the second prediction mode are possible: left prediction unit (PU) and right prediction unit (PU), or right prediction unit (PU) and left prediction unit (PU), or above prediction unit (PU) and below prediction unit (PU), or below prediction unit (PU) and above prediction unit (PU). Otherwise (i.e. if both prediction modes are not intra-block copy or palette mode or a combination of the two prediction modes) then control in the processor 205 passes to an intra test step 1202.

At an intra test step 1202, the de-blocking filter module 330 (or the de-blocking filter module 430 when the method 1200 is being performed by the video decoder 134), under control of the processor 205, tests the prediction mode of the prediction units (PUs) on either side of the considered edge. If either prediction mode is intra-prediction, then control in the processor 205 passes to a boundary strength two step 1204. Otherwise (i.e. if both prediction modes are inter-prediction) then control in the processor 205 passes to a transform and coded block flag value test step 1206.

At the boundary strength two step 1204, the de-blocking filter module 330 (or the de-blocking filter module 430 when the method 1200 is being performed by the video decoder 134), under control of the processor 205, sets the boundary strength value for the considered edge is set to two. The method 1200 then terminates.

At the coded block flag test step 1206, the de-blocking filter module 330 (or the de-blocking filter module 430 when the method 1200 is being performed by the video decoder 134), under control of the processor 205, tests the coded block flags of the luma transform blocks (TB) along either side of the considered edge. If either transform block (TB) includes at least one significant residual coefficient (i.e. the corresponding coded block flag has a value of one), then control in the processor 205 passes to the boundary strength one step 1210. Otherwise (i.e. both luma transform blocks (TBs) have no significant residual coefficients) control passes to a reference picture and motion vector test step 1208.

At the reference picture and motion vector test step 1208, the de-blocking filter module 330 (or the de-blocking filter module 430 when the method 1200 is being performed by the video decoder 134), under control of the processor 205, tests the following conditions of each prediction unit (PU):

(a) Different reference pictures are used for each prediction unit (PU) or a different number of motion vectors are used for each prediction unit (PU);

(b) One motion vector is used for each prediction unit (PU) and the absolute difference between the two motion vectors is greater than four quarter luma samples;

(c) Two motion vectors are used for each prediction unit (PU) and the same two reference pictures are used for each block and the absolute difference between each pair of motion vectors is greater than four quarter luma samples.

If any of the conditions (a)-(c) are met, control in the processor 205 passes to the boundary strength one step 1210. Otherwise (i.e. none of the conditions (a)-(c) are met), control in the processor 205 passes to boundary strength zero step 1212.

At the boundary strength one step 1210, the de-blocking filter module 330 (or the de-blocking filter module 430 when the method 1200 is being performed by the video decoder 134), under control of the processor 205, sets the boundary strength value for the considered edge is set to one. The method 1200 then terminates.

At the boundary strength zero step 1212, the de-blocking filter module 330 (or the de-blocking filter module 430 when the method 1200 is being performed by the video decoder 134), under control of the processor 205, sets the boundary strength value for the considered edge is set to zero. The method 1200 then terminates.

In one arrangement of the video encoder 114 and the video decoder 134, step 1201 of FIG. 12 is modified as follows: If either prediction mode is intra-block copy or palette mode, then control in the processor 205 passes to the boundary strength zero step 1212. In arrangements where step 1201 is modified in such a manner, for a given edge the de-blocking filter is disabled for the primary colour channel and the secondary colour channels if the prediction units (PUs) on either side of the edge are using intra-block copy mode or palette mode or a combination of the intra-block copy and palette prediction modes.

FIG. 13 is a schematic flow diagram showing a method for intra-block copying and de-blocking a block of video data. The method 1300 may be implemented as one or more software code modules implementing the video encoder 114 or the video decoder 134, which are resident on the hard disk drive 210 and are controlled in their execution by the processor 205. The method 1300 is performed in both the video encoder 114 and the video decoder 134. However, the method 1300 will be described below with reference to the video encoder 114. The method 1300 is applied to every coding tree block (CTB) in a frame.

Steps 1302-1320 as described below are performed such that the entire coding tree block (CTB) is traversed. Additionally, the method 1300 is performed for every coding tree block (CTB) in a frame of video data.

At a determine prediction modes step 1302, the prediction mode selector module 348, under control of the processor 205, in the video encoder 114 (the entropy decoder 420 in the video decoder 134) determines the prediction modes for two adjacently located prediction units (PUs). Step 1106 is also performed by the entropy decoder module 420 when the method 1300 is being performed by the video decoder 134.

At an intra-block copy test step 1304, the processor 205 tests the prediction mode of the considered prediction unit (PU). If the prediction mode indicates the use of intra-block copy, control in the processor passes to a region test step 1306. Otherwise, control in the processor 205 passes to steps either for intra-prediction or inter-prediction (not shown in FIG. 13) and then passes to the determine residual quad-tree step 1312.

At the region test step 1306, the intra-block copy module 350 in the video encoder 114 (or the intra-block copy module 436 in the video decoder 134 when the method 1300 is being performed by the video decoder 134) tests the block vector associated with the considered prediction unit (PU). If the block vector references a reference block within the current or previous coding tree unit (CTU), i.e. the reconstructed samples 370 in the video encoder 114 or the reconstructed samples 458 in the video decoder 134, control in the processor 205 passes to copy from reconstructed samples step 1308. The block vector 608 of FIG. 6 is an example of such a block vector referencing a reference block within the current and/or previous coding tree unit (CTU). Otherwise (the block vector references a reference block outside of the current and previous coding tree units (CTUs)), control in the processor 205 passes to a copy from frame buffer step 1310. The block vector 612 of FIG. 6 is an example of a block vector indicating a reference block outside of the current and previous coding tree units (CTUs).

At the copy from reconstructed samples step 1308, the multiplexor 352 in the video encoder 114 selects a block of samples from the reconstructed samples 370. The reconstructed samples selected at step 1308 are samples existing prior to in-loop filtering (i.e. de-blocking) being performed. Alternatively, the multiplexor 440 in the video decoder 134 selects a block of samples at step 1308 from the reconstructed samples 458 when the method 1300 is being performed by the video decoder 134. The reconstructed samples 370 are samples that have not been de-blocked. The reconstructed samples 370 are from a region of the frame of video data corresponding to the current coding tree unit (CTU) or the previous coding tree unit (CTU). As such, the reconstructed samples 370 are generally stored using "on-chip" memory. Use of local, or on-chip, memory reduces the bandwidth requirements to external memory (e.g., 206). On-chip memory is generally implemented using static RAM, which is costly in terms of silicon area but provides very high bandwidth. The on-chip memory generally lacks sufficient capacity to hold an entire frame of video data due to the significant cost (e.g. in terms of silicon area) of the on-chip memory.

At the copy from frame buffer step 1310, the multiplexor 352 in the video encoder 114 selects a block of samples from the frame buffer 332. The reconstructed samples selected at step 1310 have had in-loop filtering applied (i.e. de-blocking). Alternatively, the multiplexor 440 in the video decoder 134 selects a block of samples from the frame buffer 432 at step 1310 when the method 1300 is being performed by the video decoder 134. The reconstructed samples selected at the step 1310 are obtained from the frame buffer in external memory (e.g., 206). As such, the reconstructed samples selected at the step 1310 have had de-blocking filtering applied. The reconstructed samples selected at the step 1310 may be obtained from any location in the frame of video data prior to the current and previous coding tree unit (CTU). As such, the storage requirement for the samples selectable at the step 1310 exceeds practical constraints on the on-chip memory and must instead be stored in external memory (e.g., 206).

To store reconstructed samples (i.e., prior to application of the de-blocking filter) into external memory (e.g., 206) would increase the external memory bandwidth because each reconstructed coding unit (CU) would need to be stored in external memory (e.g., 206) in case the samples of the coding unit (CU) were referenced by a later coding unit (CU) configured to use intra-block copy in the frame of video data. De-blocked samples (e.g., 372) are already stored in external memory (e.g., 206) during operation of the video encoder 114. Similarly, output from the de-blocking filter module 430 is stored in the frame buffer module 432 during operation of the video decoder 134. As such, blocks of de-blocked samples are available for selection by the multiplexor 352 without a requirement to write any additional samples to external memory (e.g., 206). Moreover, an increase in external memory bandwidth for read accesses is only present for each coding unit (CU) configured to use intra-block copy. Similar behaviour occurs in the video decoder 134, with blocks of reconstructed samples in the frame buffer 432 available for selection by the multiplexor 440.

At the determine residual quad-tree step 1312, the residual quad-tree for the coding unit (CU) is determined. In the video encoder 114, the residual quad-tree is generally determined by testing a number of different residual quad-trees and for each, performing quantisation, transform, inverse quantisation and inverse transform steps (i.e. as per the modules 320-328) under control of the processor 205. Then, the residual quad tree is encoded in the encoded bitstream 312 by the entropy encoder 324, under control of the processor 205.

When the method 1300 is executed by the video decoder 134, the residual quad-tree and the residual coefficients are determined by the entropy decoder 420 at step 1312 where the entropy decoder 420 decodes the associated syntax elements from the video bitstream 312, under control of the processor 205.

Steps 1314-1320, as described below, are performed in two passes, firstly for horizontal edge testing and de-blocking and secondly for vertical edge testing and de-blocking.

At a determine prediction unit (PU) edges step 1314, the de-blocking module 330 in the video encoder 114 (or the de-blocking module 430 in the video decoder 134 when the method 1300 is being performed by the video decoder 134), under control of the processor 205, determines edge flags in an edge flag array. The edge flag array signals which edges may be de-blocked and which edges will not be de-blocked, down to a granularity of edges along an 8×8 sample grid. Edges between different prediction units (PUs) are flagged for de-blocking. The flags may be stored within the memory 206. The prediction unit (PU) boundaries for each coding unit (CU) are known based on the partition mode of the coding unit (CU).

At a determine transform unit (TU) boundaries step 1316, the de-blocking module 330 in the video encoder 114 (or the de-blocking module 430 in the video decoder 134 when the method 1300 is being performed by the video decoder 134), under control of the processor 205, determines additional edge flags in an edge flag array. In addition the edge flags set in the step 1314, any edges between different transform units (TUs) are also flagged for de-blocking. The transform unit (TU) boundaries are known based on the determined residual quad-tree (RQT) structure for each coding unit (CU).

At the determine boundary strengths step 1318, the de-blocking module 330 in the video encoder 114 (or the de-blocking module 430 in the video decoder 134 when the method 1300 is being performed by the video decoder 134), under control of the processor 205, determines a boundary strength value for each edge.

In one arrangement of the video encoder 114 and the video decoder 134, the method 1100 is invoked when performing the step 1318. In arrangements where the method 1100 is invoked when performing the step 1318, a weakening of the de-blocking filter, such that secondary colour channel edges are not de-blocked and a weak filter is applied for the primary colour channel at the edges between adjacently located intra-block copied prediction units (PUs).

In another arrangement of the video encoder 114 and the video decoder 134, the method 1200 is invoked at step 1318. In arrangements where the method 1200 is invoked at step 1318, a weakening of the de-blocking filter, such that secondary colour channel edges are not de-blocked and a weak filter is applied for the primary colour channel at the edges between adjacent prediction units where either prediction unit (PU) uses intra-block copy.

The method 1300 continues at an apply de-blocking filter step 1320, where the de-blocking module 330 in the video encoder 114 (or the de-blocking module 430 in the video decoder 134 when the method 1300 is being performed by the video decoder 134), under control of the processor 205, performs de-blocking of each edge in the coding tree block (CTB) according to the determined boundary strength values from the step 1308. The primary colour channel and the secondary colour channels are filtered using the filter strength in accordance with table 900 of FIG. 9. In particular, for a boundary strength value of one, the primary colour channel has de-blocking filtering applied and the secondary colour channels do not have de-blocking filtering applied. The method 1300 then terminates.

Appendix A shows 'working draft' text for the high efficiency video coding (HEVC) standard according to the method 1100.

Appendix B shows 'working draft' text for the high efficiency video coding (HEVC) standard according to the method 1200.

The methods of encoding block vectors described above are highly desirable as the methods improve the compression efficiency achievable by intra-block copy making intra-block copy a more competitive candidate mode for selection by a video encoder. The described methods thus improve the achievable compression efficiency.

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of de-blocking an edge of a block of samples in a frame of sample data, the method comprising:
    decoding a first prediction mode for a first block of two adjacent blocks of sample data, each of the blocks of sample data including a primary color channel and at least one secondary color channel;
    decoding a second prediction mode for a second block of the two adjacent blocks of sample data;
    determining a boundary strength value for a block of samples along an edge corresponding to a boundary between said first block of sample data and said second block of sample data if the first prediction mode and the second prediction mode are both intra-block copy, wherein the boundary strength value indicates application of a weak de-blocking filter if block vectors associated with the two adjacent blocks are different, and indicates no de-blocking filtering is applied if the block vectors are equal; and
    applying the weak de-blocking filter to the block of samples along said edge of the two blocks if the determined boundary strength value indicates that the weak de-blocking filter should be applied, the weak de-blocking filter having a filter strength that is less than the filter strength of a de-blocking filter that applied to an edge determined to have two, adjacently located, intra prediction mode blocks,
    the method being characterized in that the block vectors reference a block of samples in the frame, and also in that the weak de-blocking filter is applied to the primary color channel of the block of samples along said edge without also applying a de-blocking filter to the at least one secondary color channel of the block of sample along said edge.

2. The method according to claim 1, wherein the block of samples includes reconstructed samples.

3. The apparatus according to claim 1, wherein the block vectors have an integer pixel precision.

4. An apparatus for de-blocking an edge of a block of samples in a frame of sample data, the apparatus comprising:
    a decoding module for decoding a first prediction mode for a first block of two adjacent blocks of sample data, and for decoding a second prediction mode for a second block of the two adjacent blocks of sample data, each of the blocks of sample data including a primary color channel and at least one secondary color channel;
    a determining module for determining a boundary strength value for a block of samples along an edge corresponding to a boundary between said first block of sample data and said second block of sample data if the first prediction mode and the second prediction mode are both intra-block copy, wherein the boundary strength value indicates application of a weak de-blocking filter if block vectors associated with the two adjacent blocks are different, and indicates no de-blocking filtering is applied if the block vectors are equal; and
    an applying module for applying the weak de-blocking filter to the block of samples along said edge of the two blocks if the determined boundary strength value indicates that the weak de-blocking filter should be applied, the weak de-blocking filter having a filter strength that is less than the filter strength of a de-blocking filter that is applied to an edge determined to have two, adjacently located, intra prediction mode blocks
    the apparatus being characterized in that the block vectors reference a block of samples in the frame, and also in that the weak de-blocking filter is applied to the primary color channel of the block of samples along said edge without also applying a de-blocking filter to the at least one secondary color channel of the block of sample along said edge.

5. The apparatus according to claim 4, wherein the block of samples includes reconstructed samples.

6. The system according to claim 4, wherein the block vectors have an integer pixel precision.

7. A system for de-blocking an edge of a block of samples in a frame of sample data, the system comprising:
    a memory for storing data and a computer program;
    a processor coupled to the memory for executing the computer program, the computer program comprising instructions for:
        decoding a first prediction mode for a first block of two adjacent blocks of sample data, each of the blocks of sample data including a primary color channel and at least one secondary color channel;
        decoding a second prediction mode for a second block of the two adjacent blocks of sample data;
        determining a boundary strength value for a block of samples along an edge corresponding to a boundary between said first block of sample data and said second block of sample data if the first prediction mode and the second prediction mode are both intra-block copy, wherein the boundary strength value indicates application of a weak de-blocking filter if block vectors associated with the two adjacent blocks are different, and indicates no de-blocking filtering is applied if the block vectors are equal; and
        applying the weak de-blocking filter to the block of samples along said edge of the two blocks if the determined boundary strength value indicates that the weak de-blocking filter should be applied, the weak de-blocking filter having a filter strength that is less than the filter strength of a de-blocking filter that is applied to an edge determined to have two, adjacently located, intra prediction mode blocks
    the system being characterized in that the block vectors reference a block of samples in the frame, and also in that the weak de-blocking filter is applied to the primary color channel of the block of samples along said edge without also applying a de-blocking filter to the at least one secondary color channel of the block of sample along said edge.

8. The system according to claim 7, wherein the block of samples includes reconstructed samples.

9. A non-transitory computer readable storage medium storing a program stored on the medium for causing a computer to perform a method for de-blocking an edge of a block of samples in a frame of sample data, the method comprising:
    decoding a first prediction mode for a first block of two adjacent blocks of sample data, each of the blocks of sample data including a primary color channel and at least one secondary color channel;
    decoding a second prediction mode for a second block of the two adjacent blocks of sample data;
    determining a boundary strength value for a block of samples along an edge corresponding to a boundary between said first block of sample data and said second block of sample data if the first prediction mode and the second prediction mode are both intra-block copy, wherein the boundary strength value indicates application of a weak de-blocking filter if block vectors associated with the two adjacent blocks are different, and indicates no de-blocking filtering is applied if the block vectors are equal; and applying the weak de-blocking filter to the block of samples along said edge of the two blocks if the determined boundary strength value indicates that the weak de-blocking filter should be applied, the weak de-blocking filter having a filter strength that is less than the filter strength of a de-blocking filter that applied to an edge determined to have two, adjacently located, intra prediction mode blocks, the method being characterized in that the block vectors reference a block of samples in the frame, and also in that the weak de-blocking filter is applied to the primary color channel of the block of samples along said edge without also applying a de-blocking filter to the at least one secondary color channel of the block of sample along said edge.

10. The non-transitory computer readable storage medium according to claim 9, wherein the block of samples includes reconstructed samples.

11. The non-transitory computer readable storage medium according to claim 9, wherein the block vectors have an integer pixel precision.

\* \* \* \* \*